(12) United States Patent
Rojer

(10) Patent No.: US 7,930,317 B2
(45) Date of Patent: Apr. 19, 2011

(54) REPRESENTATION AND PROCESSING OF DECLARATIVE DISCOURSE

(76) Inventor: Alan S. Rojer, Maplewood, NJ (US)

( * ) Notice: Subject to any disclaimer, the term of this patent is extended or adjusted under 35 U.S.C. 154(b) by 330 days.

(21) Appl. No.: 12/313,176

(22) Filed: Nov. 17, 2008

(65) Prior Publication Data

US 2009/0077117 A1    Mar. 19, 2009

Related U.S. Application Data

(63) Continuation-in-part of application No. 11/023,205, filed on Dec. 24, 2004, now Pat. No. 7,454,429.

(51) Int. Cl.
*G06F 17/30* (2006.01)
(52) U.S. Cl. .................................. 707/791; 707/793
(58) Field of Classification Search ................. 707/704, 707/783, 797, 791, 793, 999.003, 999.102, 707/999.103
See application file for complete search history.

(56) References Cited

U.S. PATENT DOCUMENTS 7,398,201 B2 *   7/2008   Marchisio et al. ................ 704/9

\* cited by examiner

*Primary Examiner* — Tony Mahmoudi
*Assistant Examiner* — Fariborz Khoshnoodi

(57) ABSTRACT

A method of processing declarative discourse to a sequence of declarations is disclosed. The declarative discourse is parsed, an object-oriented data structure is constructed, and the data structure is processed to provide declarations. The discourse includes representations of statements, entities, relations, and predicates. Entity representations include nominal and scoped entity representations; names are optional for the scoped entity representations. Statements includes one or more subject entity representation and, optionally, one or more predicate representations. Scoped entity representations include one or more predicate representations. The object-oriented data structure includes nominal entity, scoped entity, relation, predicate, and statement instances corresponding to the discourse constituents. Entity instances are processed to determine dispatch entities. Relation instances. are processed to determine dispatch relations. Scope and statement instances are processed to provide declarations that combine subject dispatch entities, dispatch relations, and object dispatch entities.

1 Claim, 12 Drawing Sheets

```
struct DispatchEntity1012 {
  Text name1014;
}
```

```
struct DispatchRelation1016 {
  Text name1018;
}
```

```
struct Dispatcher1020 {
  declare1022(DispatchEntity1012 subject1024,
    DispatchRelation1016 relation1026,
    DispatchEntity1012 object1028);
  DispatchEntity1012 require_entity1030(Text name1032);
  DispatchEntity1012 new_entity1034();
  DispatchRelation1016 require_relation1036(Text name1038);
}
```

*Fig. 5*

```
struct Expression¹⁰⁴⁰ {
  bool view_species¹⁰⁴²(Viewer¹⁰⁴⁶ viewer¹⁰⁴⁴);
}
```

*Fig. 6*

```
struct Entity¹⁰⁴⁸: public Expression¹⁰⁴⁰ {
  Text name¹⁰⁵⁰;
  DispatchEntity¹⁰¹² dispatch_entity¹⁰⁵²;
}
```

*Fig. 7*

```
struct Nominal¹⁰⁵⁴: public Entity¹⁰⁴⁸ {
}
```

*Fig. 8*

```
struct Scope¹⁰⁵⁶: public Entity¹⁰⁴⁸ {
  Sequence<Predicate¹⁰⁶⁰> predicates¹⁰⁵⁸;
}
```

*Fig. 9*

```
struct Statement¹⁰⁶²: public Expression¹⁰⁴⁰ {
  Sequence<Entity¹⁰⁴⁸> subjects¹⁰⁶⁴;
  Sequence<Predicate¹⁰⁶⁰> predicates¹⁰⁶⁶;
}
```

*Fig. 10*

```
struct Predicate¹⁰⁶⁰: public Expression¹⁰⁴⁰ {
  Relation¹⁰⁷⁰ relation¹⁰⁶⁸;
  Sequence<Entity¹⁰⁴⁸> objects¹⁰⁷²;
}
```

*Fig. 11*

```
struct Relation¹⁰⁷⁰: public Expression¹⁰⁴⁰ {
  Text name¹⁰⁷⁴;
  DispatchRelation¹⁰¹⁶ dispatch_relation¹⁰⁷⁶;
}
```

*Fig. 12*

```
struct Host¹⁰⁷⁸ {
  Sequence<Expression¹⁰⁴⁰> expressions¹⁰⁸⁰;
}
```

Fig. 13

```
struct Parser^1082 {
  Host^1078 target^1084;
  Text accumulator^1086;
  bool require_nominal^1088(Text yytext^1090, Nominal^1054 new_text^1092);
  bool close_quote^1094(Text yytext^1096, Nominal^1054 new_nominal^1098);
  bool accumulate_text^1100(Text yytext^1102);
  bool accumulate_quote^1104(Text yytext^1106);
  bool accumulate_escape^1108(Text yytext^1110);
  bool accept_statement^1112(int lhs^1114, int start^1116, Statement^1062 statement^1118);
  bool statement_subject^1120(Statement^1062 lhs^1122, Entity^1048 subject^1124);
  bool statement_add_subject^1126(Statement^1062 lhs^1128,
    Statement^1062 statement^1130,
    int comma^1132,
    Entity^1048 subject^1134);
  bool statement_predicate^1136(Statement^1062 lhs^1138,
    Statement^1062 statement^1140,
    Predicate^1060 predicate^1142);
  bool statement_add_predicate^1144(Statement^1062 lhs^1146,
    Statement^1062 statement^1148,
    int semicolon^1150,
    Predicate^1060 predicate^1152);
  bool quote_append^1154(Nominal^1054 lhs^1156,
    Nominal^1054 quote^1158,
    int plus^1160,
    Nominal^1054 text^1162);
  bool bare_scope^1164(Scope^1056 lhs^1166, int open^1168);
  bool predicate_scope^1170(Scope^1056 lhs^1172,
    int open^1174,
    Predicate^1060 predicate^1176);
  bool named_predicate_scope^1178(Scope^1056 lhs^1180,
    int open^1182,
    Nominal^1054 text^1184,
    int colon^1186,
    Predicate^1060 predicate^1188);
  bool scope_add_predicate^1190(Scope^1056 lhs^1192,
    Scope^1056 scope^1194,
    int semicolon^1196,
    Predicate^1060 predicate^1198);
  bool qualifier^1200(Predicate^1060 lhs^1202, Relation^1070 relation^1204);
  bool singleton^1206(Predicate^1060 lhs^1208,
    Relation^1070 relation^1210,
    Entity^1048 object^1212);
  bool plurality^1214(Predicate^1060 lhs^1216,
    Predicate^1060 predicate^1218,
    int comma^1220,
    Entity^1048 object^1222);
  bool require_relation^1224(Relation^1070 lhs^1226, Nominal^1054 text^1228);
}
```

Fig. 14

INITIAL$^{1230}$ Lexemes

| Lexeme | Regexp | Terminal | Responder | Next |
|---|---|---|---|---|
| 1232 | /#.$/ | | | |
| 1234 | /[ \t\n]+/ | | | |
| 1236 | /":"/ | COLON$^{1238}$ | | |
| 1240 | /","/ | COMMA$^{1242}$ | | |
| 1244 | /";"/ | SEMICOLON$^{1246}$ | | |
| 1248 | /"."/ | PERIOD$^{1250}$ | | |
| 1252 | /"{"/ | OPEN$^{1254}$ | | |
| 1256 | /"}"/ | CLOSE$^{1258}$ | | |
| 1260 | "'" | | | QUOTING$^{1262}$ |
| 1264 | /[^ \n\t:,;.{}']+/ | NOMINAL$^{1266}$ | require_nominal$^{1088}$ | |

Fig. 15

QUOTING$^{1262}$ Lexemes

| Lexeme | Regexp | Terminal | Responder | Next |
|---|---|---|---|---|
| 1268 | /"'"/ | QUOTE$^{1270}$ | close_quote$^{1094}$ | INITIAL$^{1230}$ |
| 1272 | /[^\'"]+/ | | accumulate_text$^{1100}$ | |
| 1274 | /\/ | | accumulate_escape$^{1108}$ | |
| 1276 | /\'/ | | accumulate_quote$^{1104}$ | |

Fig. 16

Parser$^{1082}$ Rules

| Rule | Production | Responder |
|---|---|---|
| 1278 | start$^{1280}$ : | |
| 1282 | start$^{1280}$ : start$^{1280}$ statement$^{1284}$ | accept_statement$^{1112}$ |
| 1286 | statement$^{1284}$ : statement_body$^{1288}$ PERIOD$^{1250}$ | |
| 1290 | statement_body$^{1288}$ : statement_head$^{1292}$ | |
| 1294 | statement_body$^{1288}$ : statement_head$^{1292}$ predicate$^{1296}$ | statement_predicate$^{1136}$ |
| 1298 | statement_body$^{1288}$ : statement_body$^{1288}$ SEMICOLON$^{1246}$ predicate$^{1296}$ | statement_add_predicate$^{1144}$ |
| 1300 | statement_body$^{1288}$ : statement_body$^{1288}$ SEMICOLON$^{1246}$ | |
| 1302 | statement_head$^{1292}$ : entity$^{1304}$ | statement_subject$^{1120}$ |
| 1306 | statement_head$^{1292}$ : COMMA$^{1242}$ entity$^{1304}$ | statement_add_subject$^{1126}$ |
| 1308 | entity$^{1304}$ : nominal$^{1310}$ | |
| 1312 | entity$^{1304}$ : scope$^{1314}$ | |
| 1316 | nominal$^{1310}$ : NOMINAL$^{1266}$ | |
| 1318 | nominal$^{1310}$ : quote$^{1320}$ | |
| 1322 | quote$^{1320}$ : QUOTE$^{1270}$ | |
| 1324 | quote$^{1320}$ : quote$^{1320}$ PLUS$^{1326}$ QUOTE$^{1270}$ | quote_append$^{1154}$ |
| 1328 | scope$^{1314}$ : scope_body$^{1330}$ CLOSE$^{1258}$ | |
| 1332 | scope_body$^{1330}$ : OPEN$^{1254}$ | bare_scope$^{1164}$ |
| 1334 | scope_body$^{1330}$ : OPEN$^{1254}$ predicate$^{1296}$ | predicate_scope$^{1170}$ |
| 1336 | scope_body$^{1330}$ : OPEN$^{1254}$ nominal$^{1310}$ COLON$^{1238}$ predicate$^{1296}$ | named_predicate_scope$^{1178}$ |
| 1338 | scope_body$^{1330}$ : scope_body$^{1330}$ SEMICOLON$^{1246}$ predicate$^{1296}$ | scope_add_predicate$^{1190}$ |
| 1340 | scope_body$^{1330}$ : scope_body$^{1330}$ SEMICOLON$^{1246}$ | |
| 1342 | predicate$^{1296}$ : relation$^{1344}$ | qualifier$^{1200}$ |
| 1346 | predicate$^{1296}$ : relation$^{1344}$ entity$^{1304}$ | singleton$^{1206}$ |
| 1348 | predicate$^{1296}$ : predicate$^{1296}$ COMMA$^{1242}$ entity$^{1304}$ | plurality$^{1214}$ |
| 1350 | predicate$^{1296}$ : predicate$^{1296}$ COMMA$^{1242}$ | |
| 1352 | relation$^{1344}$ : NOMINAL$^{1266}$ | require_relation$^{1224}$ |

Fig. 17

```
bool Parser¹⁰⁸²::require_nominal¹⁰⁸⁸(Text yytext¹⁰⁹⁰, Nominal¹⁰⁵⁴ new_text¹⁰⁹²)
{
    ¹³⁵⁴new_text¹⁰⁹² = new Nominal¹⁰⁵⁴;
    ¹³⁵⁶new_text¹⁰⁹².name¹⁰⁵⁰ = yytext¹⁰⁹⁰;
    ¹³⁵⁸return 1;
}
```

Fig. 18

```
bool Parser¹⁰⁸²::close_quote¹⁰⁹⁴(Text yytext¹⁰⁹⁶, Nominal¹⁰⁵⁴ new_nominal¹⁰⁹⁸)
{
    ¹³⁶⁰new_nominal¹⁰⁹⁸ = new Nominal¹⁰⁵⁴;
    ¹³⁶²new_nominal¹⁰⁹⁸.name¹⁰⁵⁰ = accumulator¹⁰⁸⁶;
    ¹³⁶⁴accumulator¹⁰⁸⁶.clear();
    ¹³⁶⁶return 1;
}
```

Fig. 19

```
bool Parser¹⁰⁸²::accumulate_text¹¹⁰⁰(Text yytext¹¹⁰²)
{
    ¹³⁶⁸accumulator¹⁰⁸⁶.append(yytext¹¹⁰²);
    ¹³⁷⁰return 1;
}
```

Fig. 20

```
bool Parser¹⁰⁸²::accumulate_quote¹¹⁰⁴(Text yytext¹¹⁰⁶)
{
    ¹³⁷²accumulator¹⁰⁸⁶.append("´");
    ¹³⁷⁴return 1;
}
```

Fig. 21

```
bool Parser¹⁰⁸²::accumulate_escape¹¹⁰⁸(Text yytext¹¹¹⁰)
{
    ¹³⁷⁶accumulator¹⁰⁸⁶.append("\\");
    ¹³⁷⁸return 1;
}
```

Fig. 22

```
bool Parser¹⁰⁸²::accept_statement¹¹¹²(int lhs¹¹¹⁴, int start¹¹¹⁶, Statement¹⁰⁶² statement¹¹¹⁸)
{
    ¹³⁸⁰target¹⁰⁸⁴.expressions¹⁰⁸⁰.push(statement¹¹¹⁸);
    ¹³⁸²return 1;
}
```

*Fig. 23*

```
bool Parser1082::statement_subject1120(Statement1062 lhs1122, Entity1048 subject1124)
{
    1384lhs1122 = new Statement1062;
    1386lhs1122.subjects1064.push(subject1124);
    1388return 1;
}
```

*Fig. 24*

```
bool Parser1082::statement_add_subject1126(Statement1062 lhs1128,
    Statement1062 statement1130,
    int comma1132,
    Entity1048 subject1134)
{
    1390lhs1128 = statement1130;
    1392lhs1128.subjects1064.push(subject1134);
    1394return 1;
}
```

*Fig. 25*

```
bool Parser1082::statement_predicate1136(Statement1062 lhs1138,
    Statement1062 statement1140,
    Predicate1060 predicate1142)
{
    1396lhs1138 = statement1140;
    1398lhs1138.predicates1066.push(predicate1142);
    1400return 1;
}
```

*Fig. 26*

```
bool Parser1082::statement_add_predicate1144(Statement1062 lhs1146,
    Statement1062 statement1148,
    int semicolon1150,
    Predicate1060 predicate1152)
{
    1402lhs1146 = statement1148;
    1404lhs1146.predicates1066.push(predicate1152);
    1406return 1;
}
```

Fig. 27

```
bool Parser¹⁰⁸²::quote_append¹¹⁵⁴(Nominal¹⁰⁵⁴ lhs¹¹⁵⁶,
    Nominal¹⁰⁵⁴ quote¹¹⁵⁸,
    int plus¹¹⁶⁰,
    Nominal¹⁰⁵⁴ text¹¹⁶²)
{
    ¹⁴⁰⁸lhs¹¹⁵⁶ = quote¹¹⁵⁸;
    ¹⁴¹⁰lhs¹¹⁵⁶.name¹⁰⁵⁰.append(text¹¹⁶².name¹⁰⁵⁰);
    ¹⁴¹²return 1;
}
```

Fig. 28

```
bool Parser¹⁰⁸²::bare_scope¹¹⁶⁴(Scope¹⁰⁵⁶ lhs¹¹⁶⁶, int open¹¹⁶⁸)
{
    ¹⁴¹⁴lhs¹¹⁶⁶ = new Nominal¹⁰⁵⁴;
    ¹⁴¹⁶return 1;
}
```

Fig. 29

```
bool Parser¹⁰⁸²::predicate_scope¹¹⁷⁰(Scope¹⁰⁵⁶ lhs¹¹⁷²,
    int open¹¹⁷⁴,
    Predicate¹⁰⁶⁰ predicate¹¹⁷⁶)
{
    ¹⁴¹⁸lhs¹¹⁷² = new Nominal¹⁰⁵⁴;
    ¹⁴²⁰lhs¹¹⁷².predicates¹⁰⁶⁶.push(predicate¹¹⁷⁶);
    ¹⁴²²return 1;
}
```

Fig. 30

```
bool Parser¹⁰⁸²::named_predicate_scope¹¹⁷⁸(Scope¹⁰⁵⁶ lhs¹¹⁸⁰,
    int open¹¹⁸²,
    Nominal¹⁰⁵⁴ text¹¹⁸⁴,
    int colon¹¹⁸⁶,
    Predicate¹⁰⁶⁰ predicate¹¹⁸⁸)
{
    ¹⁴²⁴lhs¹¹⁸⁰ = new Nominal¹⁰⁵⁴;
    ¹⁴²⁶lhs¹¹⁸⁰.name¹⁰⁵⁰ = text¹¹⁸⁴.name¹⁰⁵⁰;
    ¹⁴²⁸lhs¹¹⁸⁰.predicates¹⁰⁶⁶.push(predicate¹¹⁸⁸);
    ¹⁴³⁰return 1;
}
```

Fig. 31

```
bool Parser¹⁰⁸²::scope_add_predicate¹¹⁹⁰(Scope¹⁰⁵⁶ lhs¹¹⁹²,
    Scope¹⁰⁵⁶ scope¹¹⁹⁴,
    int semicolon¹¹⁹⁶,
    Predicate¹⁰⁶⁰ predicate¹¹⁹⁸)
{
    ¹⁴³²lhs¹¹⁹² = scope¹¹⁹⁴;
    ¹⁴³⁴lhs¹¹⁹².predicates¹⁰⁶⁶.push(predicate¹¹⁹⁸);
    ¹⁴³⁶return 1;
}
```

*Fig. 32*

```
bool Parser¹⁰⁸²::qualifier¹²⁰⁰(Predicate¹⁰⁶⁰ lhs¹²⁰², Relation¹⁰⁷⁰ relation¹²⁰⁴)
{
    ¹⁴³⁸lhs¹²⁰² = new Predicate¹⁰⁶⁰;
    ¹⁴⁴⁰lhs¹²⁰².relation¹⁰⁶⁸ = relation¹²⁰⁴;
    ¹⁴⁴²return 1;
}
```

*Fig. 33*

```
bool Parser¹⁰⁸²::singleton¹²⁰⁶(Predicate¹⁰⁶⁰ lhs¹²⁰⁸,
    Relation¹⁰⁷⁰ relation¹²¹⁰,
    Entity¹⁰⁴⁸ object¹²¹²)
{
    ¹⁴⁴⁴lhs¹²⁰⁸ = new Predicate¹⁰⁶⁰;
    ¹⁴⁴⁶lhs¹²⁰⁸.relation¹⁰⁶⁸ = relation¹²¹⁰;
    ¹⁴⁴⁸lhs¹²⁰⁸.objects¹⁰⁷².push(object¹²¹²);
    ¹⁴⁵⁰return 1;
}
```

*Fig. 34*

```
bool Parser¹⁰⁸²::plurality¹²¹⁴(Predicate¹⁰⁶⁰ lhs¹²¹⁶,
    Predicate¹⁰⁶⁰ predicate¹²¹⁸,
    int comma¹²²⁰,
    Entity¹⁰⁴⁸ object¹²²²)
{
    ¹⁴⁵²lhs¹²¹⁶ = predicate¹²¹⁸;
    ¹⁴⁵⁴lhs¹²¹⁶.objects¹⁰⁷².push(object¹²²²);
    ¹⁴⁵⁶return 1;
}
```

*Fig. 35*

```
bool Parser¹⁰⁸²::require_relation¹²²⁴(Relation¹⁰⁷⁰ lhs¹²²⁶, Nominal¹⁰⁵⁴ text¹²²⁸)
{
    ¹⁴⁵⁸lhs¹²²⁶ = new Relation¹⁰⁷⁰;
    ¹⁴⁶⁰lhs¹²²⁶.name¹⁰⁷⁴ = text¹²²⁸.name¹⁰⁵⁰;
    ¹⁴⁶²return 1;
}
```

Fig. 36

```
struct Declarator¹⁴⁶⁴ {
  Dispatcher¹⁰²⁰ dispatcher¹⁴⁶⁶;
  Declarator¹⁴⁶⁸(Host¹⁰⁷⁸ supplied_host¹⁴⁷⁰,
    Dispatcher¹⁰²⁰ supplied_dispatcher¹⁴⁷²);
  bool apply¹⁴⁷⁴(Entity¹⁰⁴⁸ subject¹⁴⁷⁶, Predicate¹⁰⁶⁰ predicate¹⁴⁷⁸);
  bool view¹⁴⁸⁰(Statement¹⁰⁶² statement¹⁴⁸²);
  bool view¹⁴⁸⁴(Scope¹⁰⁵⁶ scope¹⁴⁸⁶);
  bool view¹⁴⁸⁸(Predicate¹⁰⁶⁰ predicate¹⁴⁹⁰);
  bool view¹⁴⁹²(Nominal¹⁰⁵⁴ nominal¹⁴⁹⁴);
  bool view¹⁴⁹⁶(Relation¹⁰⁷⁰ relation¹⁴⁹⁸);
}
```

Fig. 37

```
Declarator¹⁴⁶⁴::Declarator¹⁴⁶⁸(Host¹⁰⁷⁸ supplied_host¹⁴⁷⁰,
  Dispatcher¹⁰²⁰ supplied_dispatcher¹⁴⁷²)
{
  ¹⁵⁰⁰dispatcher¹⁴⁶⁶ = supplied_dispatcher¹⁴⁷²;
  ¹⁵⁰²foreach(Expression¹⁰⁴⁰ expression¹⁵⁰⁴ in supplied_host¹⁴⁷⁰.expressions¹⁰⁸⁰) {
    ¹⁵⁰⁶expression¹⁵⁰⁴.view_species(this);
  }
}
```

Fig. 38

```
bool Declarator¹⁴⁶⁴::apply¹⁴⁷⁴(Entity¹⁰⁴⁸ subject¹⁴⁷⁶, Predicate¹⁰⁶⁰ predicate¹⁴⁷⁸)
{
  ¹⁵⁰⁸DispatchEntity¹⁰¹² dispatch_subject¹⁵¹⁰ = subject¹⁴⁷⁶.dispatch_entity¹⁰⁵²;
  ¹⁵¹²DispatchRelation¹⁰¹⁶ dispatch_relation¹⁵¹⁴ = predicate¹⁴⁷⁸.relation¹⁰⁶⁸.dispatch_relation¹⁰⁷⁶;
  ¹⁵¹⁶if (predicate¹⁴⁷⁸.objects¹⁰⁷²) {
    ¹⁵¹⁸foreach(Entity¹⁰⁴⁸ object¹⁵²⁰ in predicate¹⁴⁷⁸.objects¹⁰⁷²) {
      ¹⁵²²DispatchEntity¹⁰¹² dispatch_object¹⁵²⁴ = object¹⁵²⁰.dispatch_entity¹⁰⁵²;
      ¹⁵²⁶dispatcher¹⁴⁶⁶.declare¹⁰²²(dispatch_subject¹⁵¹⁰,
        dispatch_relation¹⁵¹⁴,
        dispatch_object¹⁵²⁴);
    }
  }
  ¹⁵²⁸else {
    ¹⁵³⁰dispatcher¹⁴⁶⁶.declare¹⁰²²(dispatch_subject¹⁵¹⁰, dispatch_relation¹⁵¹⁴);
  }
  ¹⁵³²return 1;
}
```

*Fig. 39*

```
bool Declarator^1464::view^1480(Statement^1062 statement^1482)
{
    ^1534foreach(Entity^1048 subject^1536 in subject^1536.subjects^1064) {
        ^1538subject^1536.view_species(this);
    }
    ^1540foreach(Predicate^1060 predicate^1542 in statement^1482.predicates^1066) {
        ^1544predicate^1542.view_species(this);
    }
    ^1546foreach(Entity^1048 subject^1548 in statement^1482.subjects^1064) {
        ^1550foreach(Predicate^1060 predicate^1552 in statement^1482.predicates^1066) {
            ^1554apply^1474(subject^1548, predicate^1552);
        }
    }
    ^1556return 1;
}
```

*Fig. 40*

```
bool Declarator^1464::view^1484(Scope^1056 scope^1486)
{
    ^1558if (scope^1486.name^1050) {
        ^1560scope^1486.dispatch_entity^1052 = dispatcher^1466.require_entity^1030(scope^1486.name^1050);
    }
    ^1562else {
        ^1564scope^1486.dispatch_entity^1052 = dispatcher^1466.new_entity^1034();
    }
    ^1566foreach(Predicate^1060 predicate^1568 in scope^1486.predicates^1058) {
        ^1570predicate^1568.view_species(this);
        ^1572apply^1474(scope^1486, predicate^1568);
    }
    ^1574return 1;
}
```

*Fig. 41*

```
bool Declarator^1464::view^1488(Predicate^1060 predicate^1490)
{
    ^1576predicate^1490.relation^1068.view_species(this);
    ^1578foreach(Entity^1048 object^1580 in predicate^1490.objects^1072) {
        ^1582object^1580.view_species(this);
    }
    ^1584return 1;
}
```

*Fig. 42*

```
bool Declarator^1464::view^1492(Nominal^1054 nominal^1494)
{
    ^1586nominal^1494.dispatch_entity^1052 = dispatcher^1466.require_entity^1030(nominal^1494.name^1050);
    ^1588return 1;
}
```

*Fig. 43*

```
bool Declarator^1464::view^1496(Relation^1070 relation^1498)
{
    ^1590relation^1498.dispatch_relation^1076
        = dispatcher^1466.require_relation^1036(relation^1498.name^1074);
    ^1592return 1;
}
```

*Fig. 44*

```
bool declarator-task^1594(Dispatcher^1020 supplied_dispatcher^1596,
    Host^1078 supplied_host^1598)
{
    ^1600Parser^1082 parser^1602(supplied_host^1598);
    ^1604Declarator^1464 declarator^1606(supplied_host^1598, supplied_dispatcher^1596);
}
```

Fig. 45

```
1608 hillary¹⁶¹⁰, joe¹⁶¹², barack¹⁶¹⁴ is_democrat¹⁶¹⁶.
1618 barack¹⁶¹⁴ selected¹⁶²⁰ joe¹⁶¹²; defeated john¹⁶²⁴, sarah¹⁶²⁶.
1628 {election¹⁶³²;
    has_date¹⁶³⁴ 2008-11-04;
    has_winner¹⁶³⁶ barack¹⁶¹⁴, joe¹⁶¹²
}¹⁶³⁰.
1638 { barack¹⁶¹⁴:
    has_home_state¹⁶⁴⁰ { illinois¹⁶⁴² :
        has_city¹⁶⁴⁴ { chicago¹⁶⁸⁰ :
            has_mayor¹⁶⁸² richard¹⁶⁸⁴;
            has_county¹⁶⁸⁶ cook¹⁶⁸⁸;
        },
        { springfield¹⁶⁹⁰ :
            is_capitol¹⁶⁹²;
            has_mayor¹⁶⁸² timothy¹⁶⁹⁴;
        };
    }
}.
```

Fig. 46

```
1646 declare(hillary¹⁶¹⁰, is_democrat¹⁶¹⁶);
1648 declare(joe¹⁶¹², is_democrat¹⁶¹⁶);
1650 declare(barack¹⁶¹⁴, is_democrat¹⁶¹⁶);
1652 declare(barack¹⁶¹⁴, selected¹⁶²⁰, joe¹⁶¹²);
1654 declare(barack¹⁶¹⁴, defeated¹⁶²², john¹⁶²⁴);
1656 declare(barack¹⁶¹⁴, defeated¹⁶²², sarah¹⁶²⁶);
1658 declare(¹⁶³⁰, election¹⁶³²);
1660 declare(¹⁶³⁰, has_date¹⁶³⁴, 2008-11-04);
1662 declare(¹⁶³⁰, has_winner¹⁶³⁶, barack¹⁶¹⁴);
1664 declare(¹⁶³⁰, has_winner¹⁶³⁶, joe¹⁶¹²);
1666 declare(chicago¹⁶⁸⁰, has_mayor¹⁶⁸², richard¹⁶⁸⁴);
1668 declare(chicago¹⁶⁸⁰, has_county¹⁶⁸⁶, cook¹⁶⁸⁸);
1670 declare(springfield¹⁶⁹⁰, is_capitol¹⁶⁹²);
1672 declare(springfield¹⁶⁹⁰, has_mayor¹⁶⁸², timothy¹⁶⁹⁴);
1674 declare(illinois¹⁶⁴², has_city¹⁶⁴⁴, chicago¹⁶⁸⁰);
1676 declare(illinois¹⁶⁴², has_city¹⁶⁴⁴, springfield¹⁶⁹⁰);
1678 declare(barack¹⁶¹⁴, has_home_state¹⁶⁴⁰, illinois¹⁶⁴²);
```

U.S. 7,930,317 B2

REPRESENTATION AND PROCESSING OF DECLARATIVE DISCOURSE

CROSS REFERENCE TO RELATED APPLICATION

This is a continuation-in-part of application Ser. No. 11/023,205, filed Dec. 24, 2004 now U.S. Pat. No. 7,454,429, due to issue Nov. 18, 2008.

BACKGROUND OF THE INVENTION

The invention pertains to the provision of an application-independent formal meta-language which may be conveniently reused in application-specific contexts. More generally, the invention pertains to provision of application-specific languages, model-driven development, and software engineering.

SUMMARY

A method of processing text to a sequence of declarations is disclosed. The text provides a representation of the declaration sequence; such a representation is denoted a declarative discourse. The text is parsed, an object-oriented data structure is constructed, and the data structure is processed to provide declarations.

Declarative discourse includes representations of statements. A statement representation includes at least one subject entity representation, and, optionally, at least one predicate representation. A predicate representation includes a relation representation and, optionally, at least one object entity representation. Entity representations include nominal entity representations and scoped entity representations. Nominal entity representations behave like names. Scoped entity representations may optionally specify a name, but must have at least one predicate. Scoped entities may be freely nested in any position where an entity is required or optional, permitting a hierarchical or recursive style of presentation where desirable.

From the declarative discourse, the parser constructs an object-oriented data structure which provides an object-oriented representation of the declarative discourse. Object-oriented instances are created which correspond to statements, nominal entities, scoped entities, relations, and predicates.

The object-oriented data structure is processed to provide declarations. Each declaration includes a subject dispatch entity, a dispatch relation, and, optionally, an object dispatch entity. In a typical application, dispatch entities correspond to application-specific elements, and relations correspond to application-specific characteristics and relationships. In processing the object-oriented data structure, dispatch entities correspond to entity representations, and dispatch relations correspond to relation representations. A correspondence is thereby established from declarative discourse to application-specific elements.

Each subject and object entity instance is processed to determine a corresponding dispatch entity. Each relation instance is processed to determine a corresponding dispatch relation.

A predicate instance is processed in conjunction with a subject entity instance. If the predicate instance includes object entity instances, for each object entity instance, a declaration is provided combining the subject dispatch entity corresponding to the subject entity instance, the dispatch relation corresponding to the relation entity instance, and the object dispatch entity corresponding to the object entity instance. Otherwise, in the absence of object entity instances, a declaration is provided combining the subject dispatch entity corresponding to the subject entity instance, and the dispatch relation corresponding to the relation entity instance.

Each statement instance is processed to determine subject dispatch entities corresponding to each constituent subject entity instance. Each statement instance is additionally processed to determine dispatch relations and object dispatch entities, if any, for each predicate constituent of the statement. For all combinations of each constituent subject entity instance with each constituent predicate instance (if any), the conjunction of the subject entity instance with the predicate instance is processed as described above.

For each scope instance, a corresponding subject dispatch entity is determined. Each scope instance is additionally processed to determine dispatch relations and object dispatch entities, if any, for each predicate constituent of the scope. For each combination of the scope entity instance with each constituent predicate instance, the conjunction of the scope entity instance with the predicate instance is processed as described above.

BRIEF DESCRIPTION OF THE DRAWINGS

FIG. 5 depicts a definition for an exemplary expression class which represents an expression in a declarative discourse.

FIG. 6 depicts a definition for an exemplary entity class which represents a subject or object in an expression.

FIG. 7 depicts a definition for an exemplary nominal class which represents an entity which is associated with a unique textual value in the context of a discourse.

FIG. 8 depicts a definition for an exemplary scope class which represents an entity and a collection of predicates which are applicable to the represented entity as subject.

FIG. 9 depicts a definition for an exemplary statement class which represents an expression having at least one subject and, optionally, one or more predicates.

FIG. 10 depicts a definition for an exemplary predicate class which represents a relation and optional objects in an expression.

FIG. 11 depicts a definition for an exemplary relation class which represents a relation in a predicate.

FIG. 12 depicts a definition for an exemplary host class which provides data structures and algorithms suitable for representation and processing of declarative discourse.

FIG. 13 depicts a definition for an exemplary parser class which processes declarative discourse to a corresponding object-oriented data structure.

FIG. 14 depicts lexemes for an exemplary INITIAL parser lexical analyzer state which provides a starting state.

FIG. 15 depicts lexemes for an exemplary QUOTING parser lexical analyzer state which provides a lexer state for processing quoted text.

FIG. 16 depicts rules for an exemplary parser.

FIG. 17 depicts a definition for an exemplary require-nominal function which creates a nominal terminal corresponding to the supplied text.

FIG. 18 depicts a definition for an exemplary close-quote function which creates a nominal terminal corresponding to quoted text.

FIG. 19 depicts a definition for an exemplary accumulate-text function which accumulates supplied text to quoted text.

FIG. 20 depicts a definition for an exemplary accumulate-quote function which accumulates a literal quote character to quoted text.

FIG. 21 depicts a definition for an exemplary accumulate-escape function which accumulates a literal escape character to quoted text.

FIG. 22 depicts a definition for an exemplary accept-statement function which accepts a parsed statement for accumulation.

FIG. 23 depicts a definition for an exemplary statement-subject function which creates a statement and accumulates the supplied subject thereto.

FIG. 24 depicts a definition for an exemplary statement-add-subject function which accumulates the supplied subject to the supplied statement.

FIG. 25 depicts a definition for an exemplary statement-predicate function which accumulates the supplied predicate to the supplied statement.

FIG. 26 depicts a definition for an exemplary statement-add-predicate function which accumulates the supplied predicate to the supplied statement.

FIG. 27 depicts a definition for an exemplary quote-append function which concatenates quotes.

FIG. 28 depicts a definition for an exemplary bare-scope function which creates a new anonymous, empty scope.

FIG. 29 depicts a definition for an exemplary predicate-scope function which creates a new anonymous scope and accumulates the supplied predicate.

FIG. 30 depicts a definition for an exemplary named-predicate-scope function which creates a new named scope and installs the supplied predicate.

FIG. 31 depicts a definition for an exemplary scope-add-predicate function which accumulates the supplied predicate to the supplied scope.

FIG. 32 depicts a definition for an exemplary qualifier function which creates a new predicate using the supplied relation.

FIG. 33 depicts a definition for an exemplary singleton function which creates a new predicate using the supplied relation and the supplied object.

FIG. 34 depicts a definition for an exemplary plurality function which accumulates the supplied object to the supplied predicate.

FIG. 35 depicts a definition for an exemplary require-relation function which supplies a relation corresponding to the supplied text.

FIG. 36 depicts a definition for an exemplary declarator class which processes an object-oriented data structure representing a declarative discourse to a sequence of declaration requests.

FIG. 37 depicts a definition for an exemplary constructor function which creates and initializes the declarator and dispatches the constituent expressions of the supplied host corresponding to a declarative discourse.

FIG. 38 depicts a definition for an exemplary apply function which provides declarations combining a subject dispatch entity with a predicate dispatch relation and predicate object dispatch entities, if any.

FIG. 39 depicts a definition for an exemplary view-statement function which is responsive to statement instances.

FIG. 40 depicts a definition for an exemplary view-scope function which is responsive to scope instances.

FIG. 41 depicts a definition for an exemplary view-predicate function which is responsive to predicate instances.

FIG. 42 depicts a definition for an exemplary view-nominal function which is responsive to nominal instances.

FIG. 43 depicts a definition for an exemplary view-relation function which is responsive to relation instances.

FIG. 44 depicts a definition for an exemplary declarator-task task which processes expressions to declarations.

FIG. 45 depicts an exemplary declarative discourse.

FIG. 46 depicts declarations corresponding to an exemplary declarative discourse.

DETAILED DESCRIPTION

Figures 1, 2, 3, 4:
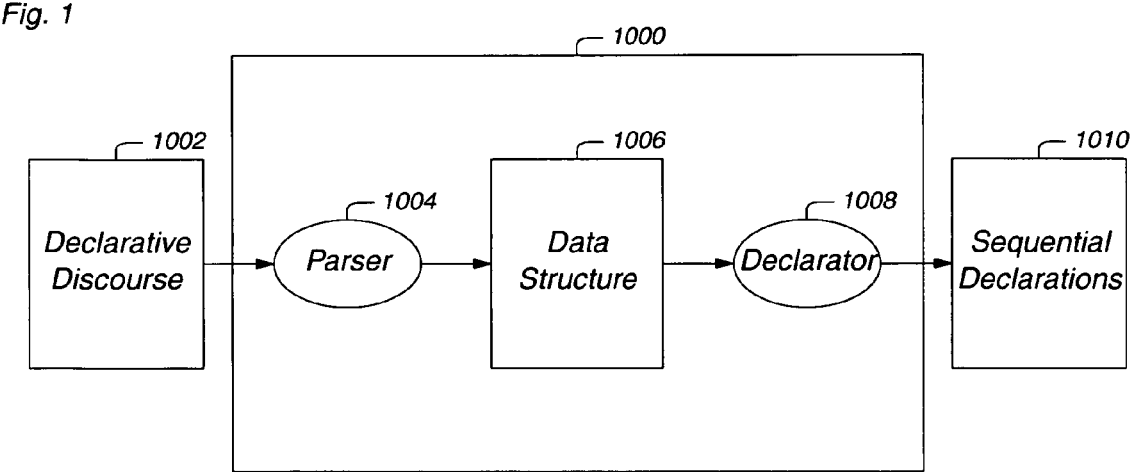
FIG. 1 depicts an overview of an exemplary system for representation and processing of declarative discourse.
FIG. 2 depicts a definition for an exemplary dispatch-entity class which represents an entity relevant to the particular application.
FIG. 3 depicts a definition for an exemplary dispatch-relation class which represents a relation potentially applicable to a subject entity and an optional object entity.
FIG. 4 depicts a definition for an exemplary dispatcher class which provides data structures and algorithms suitable for receiving declarations, typically for declarative dispatch.

The utility of the provision of a general-purpose meta-language syntax which may be readily redeployed in application-specific contexts has been well established by the widespread adoption of the Extensible Markup Language (XML). But XML is handicapped by its origins as a document specification tool, by its dearth of intrinisic computational semantics, and by its intrinsic hierarchical semantics of nested tagged segments, which limits the natural representational capabilities and requires additional representational complexity in the form of attributes, which are semantically ill-defined. Although XML enjoys a well-deserved success, designers and engineers may perhaps be forgiven for seeking to alleviate its intrinsic shortcomings in next-generation representational schemes.

The present invention is founded on an aesthetic conjecture that declarations may provide the simplest possible formal mechanism for a completely general representational scheme. Such terms as "simplest possible" and "completely general" are vague but hopefully evocative. A declaration includes a subject entity, a relation, and an optional object entity. An entity represents any relevant element for which we seek representation, according to the requirements of a particular application. A relation represents a potential characteristic of an element or a potential association between elements, again, according to the requirements of a particular application. The declaration itself represents a statement of a particular characteristic of a particular element or a particular association between particular elements. Declarations are deliberately suggestive of the subject-predicate structure of natural language; the subject entity corresponding to the natural-language subject, while the relation and optional object correspond to the natural-language predicate. Natural language uses a much richer collection of elements to represent entities and relations, but, by conjecture, this much richer collection of elements could all be reduced to declarations.

By conjecture, there is a representation consisting of a collection of declarations for any desired expression in any particular application. Most of the meaning of such an expression resides in the application-specific referents of the entities and the relations used in the expression, but this semantic problem may be considered to lie outside the scope of the syntactic problem of representing a particular collection of declarations. More particularly, a highly useful result is clearly obtained if, as designers and engineers, we may focus all of our attention on the application-specific semantics of entities and relations, and take for granted a reliable and robust syntax that will be sufficient and even congenial for representation when we have determined the application-specific semantics of entities and relations.

In considering the residual application-independent semantics of collections of declarations, the nature of the collection is of paramount concern. Given a collection of declarations, the duplication of any declaration does not add any useful information. Thus a set of declarations is clearly applicable since we may usefully enquire whether a particular declaration is present or absent. However, ordinary experience suggests that existence in time is a fundamental constraint, thus suggesting primary notions of before and after in representation of events. The fact of linearity in speech and text is also strongly indicative of the importance of sequentiality in representation. Thus a sequence of declarations with an ordering from earlier to later seems natural and perhaps essential. Moreover, in moving from a purely representational viewpoint to one that encompasses action in general and computation in particular, sequentiality is extremely useful if not essential in ensuring reliable, repeatable, deterministic behavior. Finally, a unique set may be unambiguously constructed from a sequence, but a plethora of sequences (exponential in the number of elements) may be derived from a unique set. In conclusion, although set-like and sequence-like behavior both seem to be required to achieve the full benefits of declarative representation, the sequence-like characteristic should be considered fundamental. Thus the sequence of declarations will be selected as the semantic basis of declarative representation. Declarative discourse is therefore defined as a textual representation of a sequence of declarations.

Syntactic mechanisms for declarative discourse in current use are relatively verbose in naive textual representations (e.g. N-Triples), and positively baroque in XML, e.g. standard RDF syntax. Human readers and writers thus bear an unnecessary burden. Furthermore, the representation of unnamed entities does not appear to been accorded any particular attention, although a significant burden arises from the necessity for naming all entities in practical applications. Thus the present invention seeks to provide an efficient yet natural representation for sequences of declarations with full support for unnamed entities. The scoping mechanism provided for specification of unnamed entities has the beneficial side effect of permitting a representational style that may be quite comfortable to users familiar with recursive and hierarchical representations.

Refer to FIG. 1. A system 1000 represents and processes declarative discourse. A declarative-discourse 1002 is a textual representation of a sequence of declarations. The declarative-discourse 1002 consists of constituent expressions corresponding to entities, relations, predicates, and statements. A parser 1004 processes the declarative-discourse 1002, constructing an object-oriented data-structure 1006, the constituents of which correspond to the expressions in the declarative-discourse 1002. A declarator 1008 processes the data-structure 1006, providing sequential-declarations 1010 and related operations corresponding to the declarative-discourse 1002.

Representing Declarative Discourse

Refer to FIG. 2. The dispatch-entity-class 1012 represents an entity relevant to the particular application. The dispatch-entity-class 1012 typically corresponds to an application-specific entity. The name-value 1014 associates a unique textual value with the dispatch entity. The name-value 1014 ranges over scalar text values. The name-value 1014 is optional. The name-value 1014 provides an identifier for a dispatch entity in discourse. The name-value 1014 typically represents an application-specific entity Refer to FIG. 3. The dispatch-relation-class 1016 represents a relation potentially applicable to a subject entity and an optional object entity. The dispatch-relation-class 1016 typically corresponds to an application-specific characteristic, property, or association. The name-value 1018 associates a unique textual value with the dispatch relation. The name-value 1018 ranges over scalar text values. The name-value 1018 is required. The name-value 1018 provides an identifier for a dispatch relation in discourse. The name-value 1018 typically represents an application-specific characteristic property, or association.

Refer to FIG. 4. The dispatcher-class 1020 provides data structures and algorithms suitable for receiving declarations, typically for declarative dispatch. The dispatcher-class 1020 provides a target for declarations processed from expressions. The declare-function 1022 accepts a declaration, typically for declarative dispatch. The declare-function 1022 accepts an argument subject-instance 1024, providing a dispatch-entity-class 1012 instance. The subject-instance 1024 specifies the subject of the supplied declaration. The declare-function 1022 accepts an argument relation-instance 1026, providing a dispatch-relation-class 1016 instance. The relation-instance 1026 specifies the relation of the supplied declaration. The declare-function 1022 accepts an argument object-instance 1028, providing a dispatch-entity-class 1012 instance. The object-instance 1028 specifies the object of the supplied declaration. The object-instance 1028 is optional; it defaults to null if no object is provided. The require-entity-function 1030 retrieves or creates an entity corresponding to the supplied name. The require-entity-function 1030 creates a missing entity as necessary. The require-entity-function 1030 returns a dispatch-entity-class 1012 instance. The require-entity-function 1030 accepts an argument name-value 1032 providing a text value. The name-value 1032 provides a name specifying the desired entity. The name-value 1032 corresponds to the name-value 1014. The new-entity-function 1034 creates a new anonymous entity. The new-entity-function 1034 returns a dispatch-entity-class 1012 instance. The require-relation-function 1036 retrieves a relation corresponding to the supplied name. The require-relation-function 1036 may fail on a missing relation in a strict embodiment. The require-relation-function 1036 may create a missing relation as necessary in a lax embodiment. The require-relation-function 1036 returns a dispatch-relation-class 1016 instance. The require-relation-function 1036 accepts an argument name-value 1038 providing a text value. The name-value 1038 provides a name specifying the desired relation. The name-value 1038 corresponds to the name-value 1018.

Refer to FIG. 5. The expression-class 1040 represents an expression in a declarative discourse. The expression-class 1040 provides a common base class for discourse elements including entities, relations, predicates, and statements. The view-species-function 1042 provides a generic request for double-dispatch to a specific view. The view-species-function 1042 is a virtual function that is specialized by each derived class; the specializations are not shown. The view-species-function 1042 uses the overloading of view functions in the target. The view-species-function 1042 returns a boolean value. The view-species-function 1042 accepts an argument viewer 1044, a viewer-class 1046 instance. The viewer 1044 specifies the view target.

Refer to FIG. 6. The entity-class 1048 represents a subject or object in an expression. The entity-class 1048 specializes the expression-class 1040. The name-value 1050 associates an optional unique textual value with an entity. The name-value 1050 ranges over scalar text values. The name-value 1050 provides a textual identifier for an entity in discourse. The dispatch-entity-instance 1052 provides a cache for association with a dispatch entity. The dispatch-entity-instance 1052 ranges over instances of the dispatch-entity-class 1012. The dispatch-entity-instance 1052 may reduce lookup costs for nominal entities. The dispatch-entity-instance 1052 ensures a consistent entity for unnamed entities.

Refer to FIG. 7. The nominal-class 1054 represents an entity which is associated with a unique textual value in the context of a discourse. The nominal-class 1054 specializes the entity-class 1048.

Refer to FIG. 8. The scope-class 1056 represents an entity and a collection of predicates which are applicable to the represented entity as subject. The scope-class 1056 may optionally include a nominal specification providing a unique textual value in the context of a discourse. The scope-class 1056 specializes the entity-class 1048. The predicates-sequence 1058 represents one or more predicates applicable to a subject scope. The predicates-sequence 1058 ranges over instances of the predicate-class 1060.

Refer to FIG. 9. The statement-class 1062 represents an expression having at least one subject and, optionally, one or more predicates. The statement-class 1062 specializes the expression-class 1040. The subjects-sequence 1064 represents one or more subjects in an expression. The subjects-sequence 1064 ranges over instances of the entity-class 1048. The predicates-sequence 1066 represents one or more predicates in an expression. The predicates-sequence 1066 ranges over instances of the predicate-class 1060.

Refer to FIG. 10. The predicate-class 1060 represents a relation and optional objects in an expression. The predicate-class 1060 specializes the expression-class 1040. The relation-instance 1068 represents the relation in a predicate. The relation-instance 1068 ranges over instances of the relation-class 1070. The objects-sequence 1072 represents one or more objects in a predicate. The objects-sequence 1072 ranges over instances of the entity-class 1048.

Refer to FIG. 11. The relation-class 1070 represents a relation in a predicate. The relation-class 1070 specializes the expression-class 1040. The name-value 1074 associates a unique textual value with a relation. The name-value 1074 ranges over scalar text values. The name-value 1074 is required. The dispatch-relation-instance 1076 provides a cache for association with a dispatch relation. The dispatch-relation-instance 1076 ranges over instances of the dispatch-relation-class 1016. The dispatch-relation-instance 1076 may reduce lookup costs.

Refer to FIG. 12. The host-class 1078 provides data structures and algorithms suitable for representation and processing of declarative discourse. The expressions-sequence 1080 represents a collection of expressions corresponding to a declarative discourse. The expressions-sequence 1080 ranges over instances of the expression-class 1040.

Parsing Declarative Discourse

Refer to FIG. 13. The parser-class 1082 processes declarative discourse to a corresponding object-oriented data structure. The target 1084 provides a recipient for the object-oriented data structure which is constructed by the parser. The target 1084 is specified according to the host-class 1078. The accumulator-value 1086 provides a temporary accumulator for quoted text. The accumulator-value 1086 ranges over scalar text values. The require-nominal-function 1088 creates a nominal terminal corresponding to the supplied text. The require-nominal-function 1088 returns a boolean value. The require-nominal-function 1088 accepts an argument yytext-value 1090 providing a text value. The yytext-value 1090 contains the text matched by the lexical analyzer. The require-nominal-function 1088 accepts an argument new-text-instance 1092, providing a nominal-class 1054 instance. The new-text-instance 1092 returns the newly created nominal instance. The close-quote-function 1094 creates a nominal terminal corresponding to quoted text. The close-quote-function 1094 returns a boolean value. The close-quote-function 1094 accepts an argument yytext-value 1096 providing a text value. The yytext-value 1096 contains the text matched by the lexical analyzer. The close-quote-function 1094 accepts an argument new-nominal-instance 1098, providing a nominal-class 1054 instance. The new-nominal-instance 1098 returns the newly created quote instance. The accumulate-text-function 1100 accumulates supplied text to quoted text. The accumulate-text-function 1100 returns a boolean value. The accumulate-text-function 1100 accepts an argument yytext-value 1102 providing a text value. The yytext-value 1102 contains the text matched by the lexical analyzer. The accumulate-quote-function 1104 accumulates a literal quote character to quoted text. The accumulate-quote-function 1104 returns a boolean value. The accumulate-quote-function 1104 accepts an argument yytext-value 1106 providing a text value. The yytext-value 1106 contains the text matched by the lexical analyzer. The accumulate-escape-function 1108 accumulates a literal escape character to quoted text. The accumulate-escape-function 1108 returns a boolean value. The accumulate-escape-function 1108 accepts an argument yytext-value 1110 providing a text value. The yytext-value 1110 contains the text matched by the lexical analyzer. The accept-statement-function 1112 accepts a parsed statement for accumulation. The accept-statement-function 1112 returns a boolean value. The accept-statement-function 1112 accepts an argument lhs-value 1114 providing a integer value. The lhs-value 1114 is unused. The accept-statement-function 1112 accepts an argument start-value 1116 providing a integer value. The start-value 1116 is unused. The accept-statement-function 1112 accepts an argument statement-instance 1118, providing a statement-class 1062 instance. The statement-instance 1118 supplies the statement to be accumulated. The statement-subject-function 1120 creates a statement and accumulates the supplied subject thereto. The statement-subject-function 1120 returns a boolean value. The statement-subject-function 1120 accepts an argument lhs-instance 1122, providing a statement-class 1062 instance. The lhs-instance 1122 returns the newly created statement. The statement-subject-function 1120 accepts an argument subject-instance 1124, providing a entity-class 1048 instance. The subject-instance 1124 supplies the subject to be accumulated. The statement-add-subject-function 1126 accumulates the supplied subject to the supplied statement. The statement-add-subject-function 1126 returns a boolean value. The statement-add-subject-function 1126 accepts an argument lhs-instance 1128, providing a statement-class 1062 instance. The lhs-instance 1128 returns the modified statement. The statement-add-subject-function 1126 accepts an argument statement-instance 1130, providing a statement-class 1062 instance. The statement-instance 1130 supplies the statement to receive the subject. The statement-add-subject-function 1126 accepts an argument comma-value 1132 providing a integer value. The comma-value 1132 is unused. The statement-add-subject-function 1126 accepts an argument subject-instance 1134, providing a entity-class 1048 instance. The subject-instance 1134 supplies the subject to be accumulated. The statement-predicate-function 1136 accumulates the supplied predicate to the supplied statement. The statement-predicate-function 1136 returns a boolean value. The statement-predicate-function 1136 accepts an argument lhs-instance 1138, providing a statement-class 1062 instance. The lhs-instance 1138 returns the modified statement. The statement-predicate-function 1136 accepts an argument statement-instance 1140, providing a statement-class 1062 instance. The statement-instance 1140 supplies the statement to receive the predicate. The statement-predicate-function 1136 accepts an argument predicate-instance 1142, providing a predicate-class 1060 instance. The predicate-instance 1142 supplies the predicate to be accumulated. The statement-add-predicate-function 1144 accumulates the supplied predicate to the supplied statement. The statement-add-predicate-function 1144 returns a boolean value. The statement-add-predicate-function 1144 accepts an argument lhs-instance 1146, providing a statement-class 1062 instance. The lhs-instance 1146 returns the modified statement. The statement-add-predicate-function 1144 accepts an argument statement-instance 1148, providing a statement-class 1062 instance. The statement-instance 1148 supplies the statement to receive the predicate. The statement-add-predicate-function 1144 accepts an argument semicolon-value 1150 providing a integer value. The semicolon-value 1150 is unused. The statement-add-predicate-function 1144 accepts an argument predicate-instance 1152, providing a predicate-class 1060 instance. The predicate-instance 1152 supplies the predicate to be accumulated. The quote-append-function 1154 concatenates quotes. The quote-append-function 1154 returns a boolean value. The quote-append-function 1154 accepts an argument lhs-instance 1156, providing a nominal-class 1054 instance. The lhs-instance 1156 returns the modified nominal instance. The quote-append-function 1154 accepts an argument quote-instance 1158, providing a nominal-class 1054 instance. The quote-instance 1158 supplies the nominal instance to receive the concatenation. The quote-append-function 1154 accepts an argument plus-value 1160 providing a integer value. The plus-value 1160 is unused. The quote-append-function 1154 accepts an argument text-instance 1162, providing a nominal-class 1054 instance. The text-instance 1162 supplies the text to be contenated. The bare-scope-function 1164 creates a new anonymous, empty scope. The bare-scope-function 1164 returns a boolean value. The bare-scope-function 1164 accepts an argument lhs-instance 1166, providing a scope-class 1056 instance. The lhs-instance 1166 returns the newly created scope instance. The bare-scope-function 1164 accepts an argument open-value 1168 providing a integer value. The open-value 1168 is unused. The predicate-scope-function 1170 creates a new anonymous scope and accumulates the supplied predicate. The predicate-scope-function 1170 returns a boolean value. The predicate-scope-function 1170 accepts an argument lhs-instance 1172, providing a scope-class 1056 instance. The lhs-instance 1172 returns the newly created scope instance. The predicate-scope-function 1170 accepts an argument open-value 1174 providing a integer value. The open-value 1174 is unused. The predicate-scope-function 1170 accepts an argument predicate-instance 1176, providing a predicate-class 1060 instance. The predicate-instance 1176 supplies the predicate to be accumulated to the new scope. The named-predicate-scope-function 1178 creates a new named scope and installs the supplied predicate. The named-predicate-scope-function 1178 returns a boolean value. The named-predicate-scope-function 1178 accepts an argument lhs-instance 1180, providing a scope-class 1056 instance. The lhs-instance 1180 returns the newly created scope instance. The named-predicate-scope-function 1178 accepts an argument open-value 1182 providing a integer value. The open-value 1182 is unused. The named-predicate-scope-function 1178 accepts an argument text-instance 1184, providing a nominal-class 1054 instance. The text-instance 1184 provides the nominal specification for the new scope. The named-predicate-scope-function 1178 accepts an argument colon-value 1186 providing a integer value. The colon-value 1186 is unused. The named-predicate-scope-function 1178 accepts an argument predicate-instance 1188, providing a predicate-class 1060 instance. The predicate-instance 1188 provides the predicate to be accumulated to the new scope. The scope-add-predicate-function 1190 accumulates the supplied predicate to the supplied scope. The scope-add-predicate-function 1190 returns a boolean value. The scope-add-predicate-function 1190 accepts an argument lhs-instance 1192, providing a scope-class 1056 instance. The lhs-instance 1192 returns the modified scope. The scope-add-predicate-function 1190 accepts an argument scope-instance 1194, providing a scope-class 1056 instance. The scope-instance 1194 supplies the scope to receive the supplied predicate. The scope-add-predicate-function 1190 accepts an argument semicolon-value 1196 providing a integer value. The semicolon-value 1196 is unused. The scope-add-predicate-function 1190 accepts an argument predicate-instance 1198, providing a predicate-class 1060 instance. The predicate-instance 1198 supplies the predicate to be accumulated. The qualifier-function 1200 creates a new predicate using the supplied relation. The qualifier-function 1200 does not provide any objects for the new predicate. The qualifier-function 1200 returns a boolean value. The qualifier-function 1200 accepts an argument lhs-instance 1202, providing a predicate-class 1060 instance. The lhs-instance 1202 returns the newly created predicate. The qualifier-function 1200 accepts an argument relation-instance 1204, providing a relation-class 1070 instance. The relation-instance 1204 supplies the relation for the newly created predicate. The singleton-function 1206 creates a new predicate using the supplied relation and the supplied object. The singleton-function 1206 provides a single object for the new predicate using the supplied object. The singleton-function 1206 returns a boolean value. The singleton-function 1206 accepts an argument lhs-instance 1208, providing a predicate-class 1060 instance. The lhs-instance 1208 returns the newly created predicate. The singleton-function 1206 accepts an argument relation-instance 1210, providing a relation-class 1070 instance. The relation-instance 1210 supplies the relation for the newly created predicate. The singleton-function 1206 accepts an argument object-instance 1212, providing a entity-class 1048 instance. The object-instance 1212 supplies the object entity to be accumulated to the new predicate. The plurality-function 1214 accumulates the supplied object to the supplied predicate. The plurality-function 1214 returns a boolean value. The plurality-function 1214 accepts an argument lhs-instance 1216, providing a predicate-class 1060 instance. The lhs-instance 1216 returns the modified predicate. The plurality-function 1214 accepts an argument predicate-instance 1218, providing a predicate-class 1060 instance. The predicate-instance 1218 supplies the predicate to receive the supplied object. The plurality-function 1214 accepts an argument comma-value 1220 providing a integer value. The comma-value 1220 is unused. The plurality-function 1214 accepts an argument object-instance 1222, providing a entity-class 1048 instance. The object-instance 1222 supplies the object entity to be accumulated to the supplied predicate. The require-relation-function 1224 supplies a relation corresponding to the supplied text. The require-relation-function 1224 returns a boolean value. The require-relation-function 1224 accepts an argument lhs-instance 1226, providing a relation-class 1070 instance. The lhs-instance 1226 returns the newly created relation instance. The require-relation-function 1224 accepts an argument text-instance 1228, providing a nominal-class 1054 instance. The text-instance 1228 supplies the nominal text identifying the required relation.

Refer to FIG. 14. The INITIAL-state 1230 provides a starting state.

The lexeme 1232 indicates comments in the discourse, which are ignored.

The lexeme 1234 indicates whitespace in the discourse, which is ignored. The lexeme 1234 would be refined to keep track of the discourse line count in an alternate embodiment which sought to provide useful error messages.

The lexeme 1236 recognizes the COLON-terminal 1238 terminal. The lexical analyzer returns the COLON-terminal 1238 upon detection of this pattern. The COLON-terminal 1238 separates nominal specification from predicates in scope representation.

The lexeme 1240 recognizes the COMMA-terminal 1242 terminal. The lexical analyzer returns the COMMA-terminal 1242 upon detection of this pattern. The COMMA-terminal 1242 separates entities.

The lexeme 1244 recognizes the SEMICOLON-terminal 1246 terminal. The lexical analyzer returns the SEMICOLON-terminal 1246 upon detection of this pattern. The SEMI-COLON-terminal 1246 separates predicates.

The lexeme 1248 recognizes the PERIOD-terminal 1250 terminal. The lexical analyzer returns the PERIOD-terminal 1250 upon detection of this pattern. The PERIOD-terminal 1250 terminates statements.

The lexeme 1252 recognizes the OPEN-terminal 1254 terminal. The lexical analyzer returns the OPEN-terminal 1254 upon detection of this pattern. The OPEN-terminal 1254 opens entity scope.

The lexeme 1256 recognizes the CLOSE-terminal 1258 terminal. The lexical analyzer returns the CLOSE-terminal 1258 upon detection of this pattern. The CLOSE-terminal 1258 closes entity scope.

The lexeme 1260 opens quoted text. The lexical analyzer transitions to the QUOTING-state 1262 upon detection of this pattern.

The lexeme 1264 accumulates non-space, non-punctuation characters as text. The lexical analyzer returns the NOMINAL-terminal 1266 upon detection of this pattern. The NOMINAL-terminal 1266 represents nominal text. The lexical analyzer triggers the require-nominal-function 1088 upon detection of this pattern.

Refer to FIG. 15. The QUOTING-state 1262 provides a lexer state for processing quoted text.

The lexeme 1268 closes quoted text. The lexical analyzer returns the QUOTE-terminal 1270 upon detection of this pattern. The QUOTE-terminal 1270 represents quoted text. The lexical analyzer triggers the close-quote-function 1094 upon detection of this pattern. The lexical analyzer transitions to the INITIAL-state 1230 upon detection of this pattern.

The lexeme 1272 accumulates quoted text, excluding escaped elements. The lexical analyzer triggers the accumulate-text-function 1100 upon detection of this pattern.

The lexeme 1274 accumulates an escape character within quoted text. The lexical analyzer triggers the accumulate-escape-function 1108 upon detection of this pattern.

The lexeme 1276 accumulates a quote character within quoted text. The lexical analyzer triggers the accumulate-quote-function 1104 upon detection of this pattern.

Refer to FIG. 16, which depicts parsing rules for the parser-class 1082.

The rule 1278 accepts an empty discourse as a valid discourse. The rule 1278 produces the start-nonterminal 1280. The start-nonterminal 1280 represents a valid discourse.

The rule 1282 accepts an additional statement following a valid discourse as a valid discourse. The rule 1282 produces the start-nonterminal 1280. The start-nonterminal 1280 represents a valid discourse. The rule 1282 consumes the start-nonterminal 1280. The start-nonterminal 1280 represents a valid discourse. The rule 1282 consumes the statement-nonterminal 1284. The statement-nonterminal 1284 represents a discourse statement. The statement-nonterminal 1284 corresponds to an instance of the statement-class 1062. The rule 1282 triggers the accept-statement-function 1112.

The rule 1286 concludes a discourse statement. The rule 1286 produces the statement-non-terminal 1284. The statement-nonterminal 1284 represents a discourse statement. The statement-nonterminal 1284 corresponds to an instance of the statement-class 1062. The rule 1286 consumes the statement-body-nonterminal 1288. The statement-body-nonterminal 1288 represents a partially processed discourse statement. The statement-body-nonterminal 1288 corresponds to an instance of the statement-class 1062. The rule 1286 consumes the PERIOD-terminal 1250. The PERIOD-terminal 1250 terminates statements.

The rule 1290 completes parsing of the subjects of a statement. The rule 1290 produces the statement-body-nonterminal 1288. The statement-body-nonterminal 1288 represents a partially processed discourse statement. The statement-body-nonterminal 1288 corresponds to an instance of the statement-class 1062. The rule 1290 consumes the statement-head-nonterminal 1292. The statement-head-nonterminal 1292 represents the processed subjects of a discourse statement. The statement-head-nonterminal 1292 corresponds to an instance of the statement-class 1062.

The rule 1294 completes parsing of the subjects of a statement and accepts a predicate for the statement. The rule 1294 produces the statement-body-nonterminal 1288. The statement-body-nonterminal 1288 represents a partially processed discourse statement. The statement-body-nonterminal 1288 corresponds to an instance of the statement-class 1062. The rule 1294 consumes the statement-head-nonterminal 1292. The statement-head-nonterminal 1292 represents the processed subjects of a discourse statement. The statement-head-nonterminal 1292 corresponds to an instance of the statement-class 1062. The rule 1294 consumes the predicate-nonterminal 1296. The predicate-nonterminal 1296 represents a discourse predicate. The predicate-nonterminal 1296 corresponds to an instance of the predicate-class 1060. The rule 1294 triggers the statement-predicate-function 1136.

The rule 1298 accumulates an add predicate to the statement. The rule 1298 produces the statement-body-nonterminal 1288. The statement-body-nonterminal 1288 represents a partially processed discourse statement. The statement-body-nonterminal 1288 corresponds to an instance of the statement-class 1062. The rule 1298 consumes the statement-body-nonterminal 1288. The statement-body-nonterminal 1288 represents a partially processed discourse statement. The statement-body-nonterminal 1288 corresponds to an instance of the statement-class 1062. The rule 1298 consumes the SEMICOLON-terminal 1246. The SEMICOLON-terminal 1246 separates predicates. The rule 1298 consumes the predicate-nonterminal 1296. The predicate-nonterminal 1296 represents a discourse predicate. The predicate-nonterminal 1296 corresponds to an instance of the predicate-class 1060. The rule 1298 triggers the statement-add-predicate-function 1144.

The rule 1300 tolerates a trailing semicolon. The rule 1300 produces the statement-body-nonterminal 1288. The statement-body-nonterminal 1288 represents a partially processed discourse statement. The statement-body-nonterminal 1288 corresponds to an instance of the statement-class 1062. The rule 1300 consumes the statement-body-nonterminal 1288. The statement-body-nonterminal 1288 represents a partially processed discourse statement. The statement-body-nonterminal 1288 corresponds to an instance of the statement-class 1062. The rule 1300 consumes the SEMICOLON-terminal 1246. The SEMICOLON-terminal 1246 separates predicates.

The rule 1302 creates a statement with a single subject. The rule 1302 produces the statement-head-nonterminal 1292. The statement-head-nonterminal 1292 represents the processed subjects of a discourse statement. The statement-head-nonterminal 1292 corresponds to an instance of the statement-class 1062. The rule 1302 consumes the entity-nonterminal 1304. The entity-nonterminal 1304 represents a discourse entity, capable of providing a subject or an object. The entity-nonterminal 1304 corresponds to an instance of the entity-class 1048. The rule 1302 triggers the statement-subject-function 1120.

The rule 1306 accumulates an add subject to a statement. The rule 1306 produces the statement-head-nonterminal 1292. The statement-head-nonterminal 1292 represents the processed subjects of a discourse statement. The statement-head-nonterminal 1292 corresponds to an instance of the statement-class 1062. The rule 1306 consumes the COMMA-terminal 1242. The COMMA-terminal 1242 separates entities. The rule 1306 consumes the entity-nonterminal 1304. The entity-nonterminal 1304 represents a discourse entity, capable of providing a subject or an object. The entity-nonterminal 1304 corresponds to an instance of the entity-class 1048. The rule 1306 triggers the statement-add-subject-function 1126.

The rule 1308 accepts a nominal as an entity. The rule 1308 produces the entity-nonterminal 1304. The entity-nonterminal 1304 represents a discourse entity, capable of providing a subject or an object. The entity-nonterminal 1304 corresponds to an instance of the entity-class 1048. The rule 1308 consumes the nominal-nonterminal 1310. The nominal-nonterminal 1310 represents a discourse nominal element. The nominal-nonterminal 1310 corresponds to an instance of the nominal-class 1054.

The rule 1312 accepts a scope as an entity. The rule 1312 produces the entity-nonterminal 1304. The entity-nonterminal 1304 represents a discourse entity, capable of providing a subject or an object. The entity-nonterminal 1304 corresponds to an instance of the entity-class 1048. The rule 1312 consumes the scope-nonterminal 1314. The scope-nonterminal 1314 represents a discourse scope element. The scope-nonterminal 1314 corresponds to an instance of the scope-class 1056.

The rule 1316 accepts a nominal terminal as a nominal. The rule 1316 produces the nominal-nonterminal 1310. The nominal-nonterminal 1310 represents a discourse nominal element. The nominal-nonterminal 1310 corresponds to an instance of the nominal-class 1054. The rule 1316 consumes the NOMINAL-terminal 1266. The NOMINAL-terminal 1266 represents nominal text. The NOMINAL-terminal 1266 corresponds to an instance of the nominal-class 1054.

The rule 1318 accepts a quote as a nominal. The rule 1318 produces the nominal-nonterminal 1310. The nominal-nonterminal 1310 represents a discourse nominal element. The nominal-nonterminal 1310 corresponds to an instance of the nominal-class 1054. The rule 1318 consumes the quote-nonterminal 1320. The quote-nonterminal 1320 represents a discourse quote element. The quote-nonterminal 1320 corresponds to an instance of the nominal-class 1054.

The rule 1322 accepts a quote terminal as a quote. The rule 1322 produces the quote-nonterminal 1320. The quote-nonterminal 1320 represents a discourse quote element. The quote-non-terminal 1320 corresponds to an instance of the nominal-class 1054. The rule 1322 consumes the QUOTE-terminal 1270. The QUOTE-terminal 1270 represents quoted text. The QUOTE-terminal 1270 corresponds to an instance of the nominal-class 1054.

The rule 1324 appends the content of a quote terminal to a quote. The rule 1324 produces the quote-nonterminal 1320. The quote-nonterminal 1320 represents a discourse quote element. The quote-nonterminal 1320 corresponds to an instance of the nominal-class 1054. The rule 1324 consumes the quote-nonterminal 1320. The quote-nonterminal 1320 represents a discourse quote element. The quote-nonterminal 1320 corresponds to an instance of the nominal-class 1054. The rule 1324 consumes the PLUS-terminal 1326. The PLUS-terminal 1326 joins quote elements to form a larger quote element. The rule 1324 consumes the QUOTE-terminal 1270. The QUOTE-terminal 1270 represents quoted text. The QUOTE-terminal 1270 corresponds to an instance of the nominal-class 1054. The rule 1324 triggers the quote-append-function 1154.

The rule 1328 concludes a scope. The rule 1328 produces the scope-nonterminal 1314. The scope-nonterminal 1314 represents a discourse scope element. The scope-nonterminal 1314 corresponds to an instance of the scope-class 1056. The rule 1328 consumes the scope-body-non-terminal 1330. The scope-body-nonterminal 1330 represents a partially processed scope element. The scope-body-nonterminal 1330 corresponds to an instance of the scope-class 1056. The rule 1328 consumes the CLOSE-terminal 1258. The CLOSE-terminal 1258 closes entity scope.

The rule 1332 creates a bare scope. The rule 1332 produces the scope-body-nonterminal 1330. The scope-body-nonterminal 1330 represents a partially processed scope element. The scope-body-nonterminal 1330 corresponds to an instance of the scope-class 1056. The rule 1332 consumes the OPEN-terminal 1254. The OPEN-terminal 1254 opens entity scope. The rule 1332 triggers the bare-scope-function 1164.

The rule 1334 creates an anonymous scope with an initial predicate. The rule 1334 produces the scope-body-nonterminal 1330. The scope-body-nonterminal 1330 represents a partially processed scope element. The scope-body-nonterminal 1330 corresponds to an instance of the scope-class 1056. The rule 1334 consumes the OPEN-terminal 1254. The OPEN-terminal 1254 opens entity scope. The rule 1334 consumes the predicate-nonterminal 1296. The predicate-nonterminal 1296 represents a discourse predicate. The predicate-nonterminal 1296 corresponds to an instance of the predicate-class 1060. The rule 1334 triggers the predicate-scope-function 1170.

The rule 1336 creates a scope including a nominal specification and an initial predicate. The rule 1336 produces the scope-body-nonterminal 1330. The scope-body-nonterminal 1330 represents a partially processed scope element. The scope-body-nonterminal 1330 corresponds to an instance of the scope-class 1056. The rule 1336 consumes the OPEN-terminal 1254. The OPEN-terminal 1254 opens entity scope. The rule 1336 consumes the nominal-nonterminal 1310. The nominal-nonterminal 1310 represents a discourse nominal element. The nominal-nonterminal 1310 corresponds to an instance of the nominal-class 1054. The rule 1336 consumes the COLON-terminal 1238. The COLON-terminal 1238 separates nominal specification from predicates in scope representation. The rule 1336 consumes the predicate-nonterminal 1296. The predicate-nonterminal 1296 represents a discourse predicate. The predicate-nonterminal 1296 corresponds to an instance of the predicate-class 1060. The rule 1336 triggers the named-predicate-scope-function 1178.

The rule 1338 appends a predicate to a scope. The rule 1338 produces the scope-body-non-terminal 1330. The scope-body-nonterminal 1330 represents a partially processed scope element. The scope-body-nonterminal 1330 corresponds to an instance of the scope-class 1056. The rule 1338 consumes the scope-body-nonterminal 1330. The scope-body-nonterminal 1330 represents a partially processed scope element. The scope-body-nonterminal 1330 corresponds to an instance of the scope-class 1056. The rule 1338 consumes the SEMICOLON-terminal 1246. The SEMICOLON-terminal 1246 separates predicates. The rule 1338 consumes the predicate-nonterminal 1296. The predicate-nonterminal 1296 represents a discourse predicate. The predicate-nonterminal 1296 corresponds to an instance of the predicate-class 1060. The rule 1338 triggers the scope-add-predicate-function 1190.

The rule 1340 tolerates a trailing semicolon. The rule 1340 produces the scope-body-nonterminal 1330. The scope-body-nonterminal 1330 represents a partially processed scope element. The scope-body-nonterminal 1330 corresponds to an instance of the scope-class 1056. The rule 1340 consumes the scope-body-nonterminal 1330. The scope-body-nonterminal 1330 represents a partially processed scope element. The scope-body-nonterminal 1330 corresponds to an instance of the scope-class 1056. The rule 1340 consumes the SEMICOLON-terminal 1246. The SEMICOLON-terminal 1246 separates predicates.

The rule 1342 creates a predicate having the supplied relation. The rule 1342 produces the predicate-nonterminal 1296. The predicate-nonterminal 1296 represents a discourse predicate. The predicate-nonterminal 1296 corresponds to an instance of the predicate-class 1060. The rule 1342 consumes the relation-nonterminal 1344. The relation-nonterminal 1344 represents a discourse relation in a predicate. The relation-nonterminal 1344 corresponds to an instance of the relation-class 1070. The rule 1342 triggers the qualifier-function 1200.

The rule 1346 creates a predicate having the supplied relation and a single object entity. The rule 1346 produces the predicate-nonterminal 1296. The predicate-nonterminal 1296 represents a discourse predicate. The predicate-nonterminal 1296 corresponds to an instance of the predicate-class 1060. The rule 1346 consumes the relation-nonterminal 1344. The relation-nonterminal 1344 represents a discourse relation in a predicate. The relation-nonterminal 1344 corresponds to an instance of the relation-class 1070. The rule 1346 consumes the entity-nonterminal 1304. The entity-nonterminal 1304 represents a discourse entity, capable of providing a subject or an object. The entity-nonterminal 1304 corresponds to an instance of the entity-class 1048. The rule 1346 triggers the singleton-function 1206.

The rule 1348 accumulates an additional object to a predicate. The rule 1348 produces the predicate-nonterminal 1296. The predicate-nonterminal 1296 represents a discourse predicate. The predicate-nonterminal 1296 corresponds to an instance of the predicate-class 1060. The rule 1348 consumes the predicate-nonterminal 1296. The predicate-nonterminal 1296 represents a discourse predicate. The predicate-nonterminal 1296 corresponds to an instance of the predicate-class 1060. The rule 1348 consumes the COMMA-terminal 1242. The COMMA-terminal 1242 separates entities. The rule 1348 consumes the entity-nonterminal 1304. The entity-non-terminal 1304 represents a discourse entity, capable of providing a subject or an object. The entity-non-terminal 1304 corresponds to an instance of the entity-class 1048. The rule 1348 triggers the plurality-function 1214.

The rule 1350 tolerates a trailing comma. The rule 1350 produces the predicate-nonterminal 1296. The predicate-nonterminal 1296 represents a discourse predicate. The predicate-nonterminal 1296 corresponds to an instance of the predicate-class 1060. The rule 1350 consumes the predicate-nonterminal 1296. The predicate-nonterminal 1296 represents a discourse predicate. The predicate-nonterminal 1296 corresponds to an instance of the predicate-class 1060. The rule 1350 consumes the COMMA-terminal 1242. The COMMA-terminal 1242 separates entities.

The rule 1352 creates a relation corresponding to the nominal terminal. The rule 1352 produces the relation-nonterminal 1344. The relation-nonterminal 1344 represents a discourse relation in a predicate. The relation-nonterminal 1344 corresponds to an instance of the relation-class 1070. The rule 1352 consumes the NOMINAL-terminal 1266. The NOMINAL-terminal 1266 represents nominal text. The NOMINAL-terminal 1266 corresponds to an instance of the nominal-class 1054. The rule 1352 triggers the require-relation-function 1224.

Refer to FIG. 17. The require-nominal-function 1088 creates a nominal terminal corresponding to the supplied text. The yytext-value 1090 contains the text matched by the lexical analyzer. The yytext-value 1090 ranges over scalar text values. The new-text-instance 1092 returns the newly created nominal instance. The new-text-instance 1092 ranges over instances of the nominal-class 1054. The create-step 1354 creates an instance of the nominal-class 1054 and assigns it to the new-text-instance 1092. The assignment-step 1356 assigns the yytext-value 1090 to the name-value 1050 of the new-text-instance 1092. The step 1358 returns boolean one to indicate success.

Refer to FIG. 18. The close-quote-function 1094 creates a nominal terminal corresponding to quoted text. The yytext-value 1096 contains the text matched by the lexical analyzer. The yytext-value 1096 ranges over scalar text values. The new-nominal-instance 1098 returns the newly created quote instance. The new-nominal-instance 1098 ranges over instances of the nominal-class 1054. The create-step 1360 creates an instance of the nominal-class 1054 and assigns it to the new-nominal-instance 1098. The assignment-step 1362 assigns the accumulator-value 1086 to the name-value 1050 of the new-nominal-instance 1098. The step 1364 clears the accumulator-value 1086. The step 1366 returns boolean one to indicate success.

Refer to FIG. 19. The accumulate-text-function 1100 accumulates supplied text to quoted text. The yytext-value 1102 contains the text matched by the lexical analyzer. The yytext-value 1102 ranges over scalar text values. The step 1368 appends the yytext-value 1102 to the accumulator-value 1086. The step 1370 returns boolean one to indicate success.

Refer to FIG. 20. The accumulate-quote-function 1104 accumulates a literal quote character to quoted text. The yytext-value 1106 contains the text matched by the lexical analyzer. The yytext-value 1106 ranges over scalar text values. The step 1372 appends the indicated value to the accumulator-value 1086. The step 1374 returns boolean one to indicate success.

Refer to FIG. 21. The accumulate-escape-function 1108 accumulates a literal escape character to quoted text. The yytext-value 1110 contains the text matched by the lexical analyzer. The yytext-value 1110 ranges over scalar text values. The step 1376 appends the indicated value to the accumulator-value 1086. The step 1378 returns boolean one to indicate success.

Refer to FIG. 22. The accept-statement-function 1112 accepts a parsed statement for accumulation. The lhs-value 1114 is unused. The lhs-value 1114 ranges over scalar integer values. The start-value 1116 is unused. The start-value 1116 ranges over scalar integer values. The statement-instance 1118 supplies the statement to be accumulated. The statement-instance 1118 ranges over instances of the statement-class 1062. The push-step 1380 pushes the statement-instance 1118 onto the expressions-sequence 1080 of the target 1084. The step 1382 returns boolean one to indicate success.

Refer to FIG. 23. The statement-subject-function 1120 creates a statement and accumulates the supplied subject thereto. The lhs-instance 1122 returns the newly created statement. The lhs-instance 1122 ranges over instances of the statement-class 1062. The subject-instance 1124 supplies the subject to be accumulated. The subject-instance 1124 ranges over instances of the entity-class 1048. The create-step 1384 creates an instance of the statement-class 1062 and assigns it to the lhs-instance 1122. The push-step 1386 pushes the subject-instance 1124 onto the subjects-sequence 1064 of the lhs-instance 1122. The step 1388 returns boolean one to indicate success.

Refer to FIG. 24. The statement-add-subject-function 1126 accumulates the supplied subject to the supplied statement. The lhs-instance 1128 returns the modified statement. The lhs-instance 1128 ranges over instances of the statement-class 1062. The statement-instance 1130 supplies the statement to receive the subject. The statement-instance 1130 ranges over instances of the statement-class 1062. The comma-value 1132 is unused. The comma-value 1132 ranges over scalar integer values. The subject-instance 1134 supplies the subject to be accumulated. The subject-instance 1134 ranges over instances of the entity-class 1048. The assignment-step 1390 assigns the statement-instance 1130 to the lhs-instance 1128. The push-step 1392 pushes the subject-instance 1134 onto the subjects-sequence 1064 of the lhs-instance 1128. The step 1394 returns boolean one to indicate success.

Refer to FIG. 25. The statement-predicate-function 1136 accumulates the supplied predicate to the supplied statement. The lhs-instance 1138 returns the modified statement. The lhs-instance 1138 ranges over instances of the statement-class 1062. The statement-instance 1140 supplies the statement to receive the predicate. The statement-instance 1140 ranges over instances of the statement-class 1062. The predicate-instance 1142 supplies the predicate to be accumulated. The predicate-instance 1142 ranges over instances of the predicate-class 1060. The assignment-step 1396 assigns the statement-instance 1140 to the lhs-instance 1138. The push-step 1398 pushes the predicate-instance 1142 onto the predicates-sequence 1066 of the lhs-instance 1138. The step 1400 returns boolean one to indicate success.

Refer to FIG. 26. The statement-add-predicate-function 1144 accumulates the supplied predicate to the supplied statement. The lhs-instance 1146 returns the modified statement. The lhs-instance 1146 ranges over instances of the statement-class 1062. The statement-instance 1148 supplies the statement to receive the predicate. The statement-instance 1148 ranges over instances of the statement-class 1062. The semicolon-value 1150 is unused. The semicolon-value 1150 ranges over scalar integer values. The predicate-instance 1152 supplies the predicate to be accumulated. The predicate-instance 1152 ranges over instances of the predicate-class 1060. The assignment-step 1402 assigns the statement-instance 1148 to the lhs-instance 1146. The push-step 1404 pushes the predicate-instance 1152 onto the predicates-sequence 1066 of the lhs-instance 1146. The step 1406 returns boolean one to indicate success.

Refer to FIG. 27. The quote-append-function 1154 concatenates quotes. The lhs-instance 1156 returns the modified nominal instance. The lhs-instance 1156 ranges over instances of the nominal-class 1054. The quote-instance 1158 supplies the nominal instance to receive the con-catenation. The quote-instance 1158 ranges over instances of the nominal-class 1054. The plus-value 1160 is unused. The plus-value 1160 ranges over scalar integer values. The text-instance 1162 supplies the text to be contenated. The text-instance 1162 ranges over instances of the nominal-class 1054. The assignment-step 1408 assigns the quote-instance 1158 to the lhs-instance 1156. The step 1410 appends the name-value 1050 of the text-instance 1162 to the name-value 1050 of the lhs-instance 1156. The step 1412 returns boolean one to indicate success.

Refer to FIG. 28. The bare-scope-function 1164 creates a new anonymous, empty scope. The lhs-instance 1166 returns the newly created scope instance. The lhs-instance 1166 ranges over instances of the scope-class 1056. The open-value 1168 is unused. The open-value 1168 ranges over scalar integer values. The create-step 1414 creates an instance of the nominal-class 1054 and assigns it to the lhs-instance 1166. The step 1416 returns boolean one to indicate success.

Refer to FIG. 29. The predicate-scope-function 1170 creates a new anonymous scope and accumulates the supplied predicate. The lhs-instance 1172 returns the newly created scope instance. The lhs-instance 1172 ranges over instances of the scope-class 1056. The open-value 1174 is unused. The open-value 1174 ranges over scalar integer values. The predicate-instance 1176 supplies the predicate to be accumulated to the new scope. The predicate-instance 1176 ranges over instances of the predicate-class 1060. The create-step 1418 creates an instance of the nominal-class 1054 and assigns it to the lhs-instance 1172. The push-step 1420 pushes the predicate-instance 1176 onto the predicates-sequence 1066 of the lhs-instance 1172. The step 1422 returns boolean one to indicate success.

Refer to FIG. 30. The named-predicate-scope-function 1178 creates a new named scope and installs the supplied predicate. The lhs-instance 1180 returns the newly created scope instance. The lhs-instance 1180 ranges over instances of the scope-class 1056. The open-value 1182 is unused. The open-value 1182 ranges over scalar integer values. The text-instance 1184 provides the nominal specification for the new scope. The text-instance 1184 ranges over instances of the nominal-class 1054. The colon-value 1186 is unused. The colon-value 1186 ranges over scalar integer values. The predicate-instance 1188 provides the predicate to be accumulated to the new scope. The predicate-instance 1188 ranges over instances of the predicate-class 1060. The create-step 1424 creates an instance of the nominal-class 1054 and assigns it to the lhs-instance 1180. The assignment-step 1426 assigns the name-value 1050 of the text-instance 1184 to the name-value 1050 of the lhs-instance 1180. The push-step 1428 pushes the predicate-instance 1188 onto the predicates-sequence 1066 of the lhs-instance 1180. The step 1430 returns boolean one to indicate success.

Refer to FIG. 31. The scope-add-predicate-function 1190 accumulates the supplied predicate to the supplied scope. The lhs-instance 1192 returns the modified scope. The lhs-instance 1192 ranges over instances of the scope-class 1056. The scope-instance 1194 supplies the scope to receive the supplied predicate. The scope-instance 1194 ranges over instances of the scope-class 1056. The semicolon-value 1196 is unused. The semicolon-value 1196 ranges over scalar integer values. The predicate-instance 1198 supplies the predicate to be accumulated. The predicate-instance 1198 ranges over instances of the predicate-class 1060. The assignment-step 1432 assigns the scope-instance 1194 to the lhs-instance 1192. The push-step 1434 pushes the predicate-instance 1198 onto the predicates-sequence 1066 of the lhs-instance 1192. The step 1436 returns boolean one to indicate success.

Refer to FIG. 32. The qualifier-function 1200 creates a new predicate using the supplied relation. The qualifier-function 1200 does not provide any objects for the new predicate. The lhs-instance 1202 returns the newly created predicate. The lhs-instance 1202 ranges over instances of the predicate-class 1060. The relation-instance 1204 supplies the relation for the newly created predicate. The relation-instance 1204 ranges over instances of the relation-class 1070. The create-step 1438 creates an instance of the predicate-class 1060 and assigns it to the lhs-instance 1202. The assignment-step 1440 assigns the relation-instance 1204 to the relation-instance 1068 of the lhs-instance 1202. The step 1442 returns boolean one to indicate success.

Refer to FIG. 33. The singleton-function 1206 creates a new predicate using the supplied relation and the supplied object. The singleton-function 1206 provides a single object for the new predicate using the supplied object. The lhs-instance 1208 returns the newly created predicate. The lhs-instance 1208 ranges over instances of the predicate-class 1060. The relation-instance 1210 supplies the relation for the newly created predicate. The relation-instance 1210 ranges over instances of the relation-class 1070. The object-instance 1212 supplies the object entity to be accumulated to the new predicate. The object-instance 1212 ranges over instances of the entity-class 1048. The create-step 1444 creates an instance of the predicate-class 1060 and assigns it to the lhs-instance 1208. The assignment-step 1446 assigns the relation-instance 1210 to the relation-instance 1068 of the lhs-instance 1208. The push-step 1448 pushes the object-instance 1212 onto the objects-sequence 1072 of the lhs-instance 1208. The step 1450 returns boolean one to indicate success.

Refer to FIG. 34. The plurality-function 1214 accumulates the supplied object to the supplied predicate. The lhs-instance 1216 returns the modified predicate. The lhs-instance 1216 ranges over instances of the predicate-class 1060. The predicate-instance 1218 supplies the predicate to receive the supplied object. The predicate-instance 1218 ranges over instances of the predicate-class 1060. The comma-value 1220 is unused. The comma-value 1220 ranges over scalar integer values. The object-instance 1222 supplies the object entity to be accumulated to the supplied predicate. The object-instance 1222 ranges over instances of the entity-class 1048. The assignment-step 1452 assigns the predicate-instance 1218 to the lhs-instance 1216. The push-step 1454 pushes the object-instance 1222 onto the objects-sequence 1072 of the lhs-instance 1216. The step 1456 returns boolean one to indicate success.

Refer to FIG. 35. The require-relation-function 1224 supplies a relation corresponding to the supplied text. The lhs-instance 1226 returns the newly created relation instance. The lhs-instance 1226 ranges over instances of the relation-class 1070. The text-instance 1228 supplies the nominal text identifying the required relation. The text-instance 1228 ranges over instances of the nominal-class 1054. The create-step 1458 creates an instance of the relation-class 1070 and assigns it to the lhs-instance 1226. The assignment-step 1460 assigns the name-value 1050 of the text-instance 1228 to the name-value 1074 of the lhs-instance 1226. The step 1462 returns boolean one to indicate success.

Processing Declarative Discourse

Refer to FIG. 36. The declarator-class 1464 processes an object-oriented data structure representing a declarative discourse to a sequence of declaration requests. The declarator-class 1464 specializes the viewer-class 1046. The dispatcher 1466 accepts declarations processed from expressions. The dispatcher 1466 is specified according to the dispatcher-class 1020. The constructor-function 1468 creates and initializes the declarator and dispatches the constituent expressions of the supplied host corresponding to a declarative discourse. The constructor-function 1468 accepts an argument supplied-host 1470, a host-class 1078 instance. The supplied-host 1470 supplies expressions to be processed. The constructor-function 1468 accepts an argument supplied-dispatcher 1472, a dispatcher-class 1020 instance. The supplied-dispatcher 1472 accepts declarations processed from expressions. The apply-function 1474 provides declarations combining a subject dispatch entity with a predicate dispatch relation and predicate object dispatch entities, if any. The apply-function 1474 returns a boolean value. The apply-function 1474 accepts an argument subject-instance 1476, providing a entity-class 1048 instance. The subject-instance 1476 supplies a subject entity instance to provide a subject dispatch entity. The apply-function 1474 accepts an argument predicate-instance 1478, providing a predicate-class 1060 instance. The predicate-instance 1478 supplies a predicate instance to provide a dispatch relation and, optionally, object dispatch entities. The view-statement-function 1480 is responsive to statement instances. The view-statement-function 1480 returns a boolean value. The view-statement-function 1480 accepts an argument statement-instance 1482, providing a statement-class 1062 instance. The statement-instance 1482 supplies a statement instance to be processed. The view-scope-function 1484 is responsive to scope instances. The view-scope-function 1484 returns a boolean value. The view-scope-function 1484 accepts an argument scope-instance 1486, providing a scope-class 1056 instance. The scope-instance 1486 supplies a scope instance to be processed. The view-predicate-function 1488 is responsive to predicate instances. The view-predicate-function 1488 returns a boolean value. The view-predicate-function 1488 accepts an argument predicate-instance 1490, providing a predicate-class 1060 instance. The predicate-instance 1490 supplies a predicate instance to be processed. The view-nominal-function 1492 is responsive to nominal instances. The view-nominal-function 1492 returns a boolean value. The view-nominal-function 1492 accepts an argument nominal-instance 1494, providing a nominal-class 1054 instance. The nominal-instance 1494 supplies a nominal instance to be processed. The view-relation-function 1496 is responsive to relation instances. The view-relation-function 1496 returns a boolean value. The view-relation-function 1496 accepts an argument relation-instance 1498, providing a relation-class 1070 instance. The relation-instance 1498 supplies a relation instance to be processed.

Refer to FIG. 37. The constructor-function 1468 creates and initializes the declarator and dispatches the constituent expressions of the supplied host corresponding to a declarative discourse. The supplied-host 1470 supplies expressions to be processed. The supplied-host 1470 is specified according to the host-class 1078. The supplied-dispatcher 1472 accepts declarations processed from expressions. The supplied-dispatcher 1472 is specified according to the dispatcher-class 1020. The assignment-step 1500 assigns the supplied-dispatcher 1472 to the dispatcher 1466. The foreach-step 1502 uses an iterator expression-instance 1504 ranging over instances of the class expression-class 1040 and operating over a domain specified by the expressions-sequence 1080 of the supplied-host 1470. The step 1506, subordinate to the foreach-step 1502, dispatches a species view request to the expression-instance 1504 for the implicit object responsive to the member function.

Refer to FIG. 38. The apply-function 1474 provides declarations combining a subject dispatch entity with a predicate dispatch relation and predicate object dispatch entities, if any. The subject-instance 1476 supplies a subject entity instance to provide a subject dispatch entity. The subject-instance 1476 ranges over instances of the entity-class 1048. The predicate-instance 1478 supplies a predicate instance to provide a dispatch relation and, optionally, object dispatch entities. The predicate-instance 1478 ranges over instances of the predicate-class 1060. The declaration-step 1508 specifies the dispatch-subject-instance 1510. The dispatch-subject-instance 1510 ranges over instances of the dispatch-entity-class 1012. The dispatch-subject-instance 1510 is initialized to the dispatch-entity-instance 1052 of the subject-instance 1476. The declaration-step 1512 specifies the dispatch-relation-instance 1514. The dispatch-relation-instance 1514 ranges over instances of the dispatch-relation-class 1016. The dispatch-relation-instance 1514 is initialized to the dispatch-relation-instance 1076 of the relation-instance 1068 of the predicate-instance 1478. The if-step 1516 tests the objects-sequence 1072 of the predicate-instance 1478. The foreach-step 1518, subordinate to the if-step 1516, uses an iterator object-instance 1520 ranging over instances of the class entity-class 1048 and operating over a domain specified by the objects-sequence 1072 of the predicate-instance 1478. The declaration-step 1522, subordinate to the foreach-step 1518, specifies the dispatch-object-instance 1524. The dispatch-object-instance 1524 ranges over instances of the dispatch-entity-class 1012. The dispatch-object-instance 1524 is initialized to the dispatch-entity-instance 1052 of the object-instance 1520. The invocation-step 1526, subordinate to the foreach-step 1518, invokes the declare-function 1022 of the dispatcher 1466 with the dispatch-subject-instance 1510 and the dispatch-relation-instance 1514 and the dispatch-object-instance 1524. Alternatively, the else-step 1528 is evaluated. The invocation-step 1530, subordinate to the else-step 1528, invokes the declare-function 1022 of the dispatcher 1466 with the dispatch-subject-instance 1510 and the dispatch-relation-instance 1514. The step 1532 returns boolean one to indicate success.

Refer to FIG. 39. The view-statement-function 1480 is responsive to statement instances. The statement-instance 1482 supplies a statement instance to be processed. The statement-instance 1482 ranges over instances of the statement-class 1062. The foreach-step 1534 uses an iterator subject-instance 1536 ranging over instances of the class entity-class 1048 and operating over a domain specified by the subjects-sequence 1064 of the subject-instance 1536. The step 1538, subordinate to the foreach-step 1534, dispatches a species view request to the subject-instance 1536 for the implicit object responsive to the member function. The foreach-step 1540 uses an iterator predicate-instance 1542 ranging over instances of the class predicate-class 1060 and operating over a domain specified by the predicates-sequence 1066 of the statement-instance 1482. The step 1544, subordinate to the foreach-step 1540, dispatches a species view request to the predicate-instance 1542 for the implicit object responsive to the member function. The foreach-step 1546 uses an iterator subject-instance 1548 ranging over instances of the class entity-class 1048 and operating over a domain specified by the subjects-sequence 1064 of the statement-instance 1482. The foreach-step 1550, subordinate to the foreach-step 1546, uses an iterator predicate-instance 1552 ranging over instances of the class predicate-class 1060 and operating over a domain specified by the predicates-sequence 1066 of the statement-instance 1482. The invocation-step 1554, subordinate to the foreach-step 1550, invokes the apply-function 1474 with the subject-instance 1548 and the predicate-instance 1552. The step 1556 returns boolean one to indicate success.

Refer to FIG. 40. The view-scope-function 1484 is responsive to scope instances. The scope-instance 1486 supplies a scope instance to be processed. The scope-instance 1486 ranges over instances of the scope-class 1056. The if-step 1558 tests the name-value 1050 of the scope-instance 1486. The assignment-step 1560, subordinate to the if-step 1558, assigns the result of the invocation of the require-entity-function 1030 of the dispatcher 1466 with the name-value 1050 of the scope-instance 1486 to the dispatch-entity-instance 1052 of the scope-instance 1486. Alternatively, the else-step 1562 is evaluated. The assignment-step 1564, subordinate to the else-step 1562, assigns the result of the invocation of the new-entity-function 1034 of the dispatcher 1466 to the dispatch-entity-instance 1052 of the scope-instance 1486. The foreach-step 1566 uses an iterator predicate-instance 1568 ranging over instances of the class predicate-class 1060 and operating over a domain specified by the predicates-sequence 1058 of the scope-instance 1486. The step 1570, subordinate to the foreach-step 1566, dispatches a species view request to the predicate-instance 1568 for the implicit object responsive to the member function. The invocation-step 1572, subordinate to the foreach-step 1566, invokes the apply-function 1474 with the scope-instance 1486 and the predicate-instance 1568. The step 1574 returns boolean one to indicate success.

Refer to FIG. 41. The view-predicate-function 1488 is responsive to predicate instances. The predicate-instance 1490 supplies a predicate instance to be processed. The predicate-instance 1490 ranges over instances of the predicate-class 1060. The step 1576 dispatches a species view request to the relation-instance 1068 of the predicate-instance 1490 for the implicit object responsive to the member function. The foreach-step 1578 uses an iterator object-instance 1580 ranging over instances of the class entity-class 1048 and operating over a domain specified by the objects-sequence 1072 of the predicate-instance 1490. The step 1582, subordinate to the foreach-step 1578, dispatches a species view request to the object-instance 1580 for the implicit object responsive to the member function. The step 1584 returns boolean one to indicate success.

Refer to FIG. 42. The view-nominal-function 1492 is responsive to nominal instances. The nominal-instance 1494 supplies a nominal instance to be processed. The nominal-instance 1494 ranges over instances of the nominal-class 1054. The assignment-step 1586 assigns the result of the invocation of the require-entity-function 1030 of the dispatcher 1466 with the name-value 1050 of the nominal-instance 1494 to the dispatch-entity-instance 1052 of the nominal-instance 1494. The step 1588 returns boolean one to indicate success.

Refer to FIG. 43. The view-relation-function 1496 is responsive to relation instances. The relation-instance 1498 supplies a relation instance to be processed. The relation-instance 1498 ranges over instances of the relation-class 1070. The assignment-step 1590 assigns the result of the invocation of the require-relation-function 1036 of the dispatcher 1466 with the name-value 1074 of the relation-instance 1498 to the dispatch-relation-instance 1076 of the relation-instance 1498. The step 1592 returns boolean one to indicate success.

Refer to FIG. 44. The declarator-task-task 1594 processes expressions to declarations. The supplied-dispatcher 1596 accepts declarations processed from expressions. The supplied-dispatcher 1596 is specified according to the dispatcher-class 1020. The supplied-host 1598 provides expressions to be processed. The supplied-host 1598 is specified according to the host-class 1078. The declaration-step 1600, subordinate to the declarator-task-task 1594, specifies the parser 1602. The declaration-step 1604, subordinate to the declarator-task-task 1594, specifies the declarator 1606.

Declarative Discourse Example

Refer to FIG. 45. An exemplary declarative discourse consists of three statements. In the first statement 1608, three nominal subject entities, hillary 1610, joe 1612, and barack 1614, are combined with a single predicate. The predicate uses the relation is-democrat 1616; no objects are specified in the predicate. In the second statement 1618, a single subject entity, barack 1614, is combined with two predicates. The first combining predicate uses the relation selected 1620, and provides an object joe 1612. The second combining predicate uses the relation defeated 1622, and provides two object entities, john 1624 and sarah 1626. The third statement 1628 consists only of a single scope-entity 1630. The scope entity is provided with three predicates. The first scope predicate uses the relation election 1632. No object is specified. The second scope predicate uses the relation has-date 1634, with object the entity 2008-11-04. The second scope predicate uses the relation has-winner 1636, with two object entities, barack 1614 and joe 1612.

The fourth statement 1638 consists only of a single scope subject. The subject scope of statement 1638 uses a nominal specification to refer to subject barack 1614. A single predicate is specified in the outermost scope, with relation has-home-state 1640. The outer predicate also has a single object, illinois 1642, which is specified in a scope using a nominal specification. The scope corresponding to illinois 1642 also contains a single predicate, having relation has-city 1644, and a pair of objects, each of those specified by a scope having a nominal specification. These scopes in turn each provide two predicates. The statement 1638 demonstrates a hierarchical presentation style for declarative discourse.

Refer to FIG. 46, which depicts the declarations resulting from processing the exemplary declarative discourse. Declarations declaration 1646, declaration 1648, and declaration 1650 correspond to statement 1608. The declaration 1646 specifies subject hillary 1610 and relation is-democrat 1616. No object is specified. The declaration 1648 specifies subject joe 1612 and relation is-democrat 1616. The declaration 1650 specifies subject barack 1614 and relation is-democrat 1616. Declarations declaration 1652, declaration 1654, and declaration 1656 correspond to statement 1618. The declaration 1652 specifies subject barack 1614, relation selected 1620, and object joe 1612. The declaration 1654 specifies subject barack 1614, relation defeated 1622, and object john 1624. The declaration 1656 specifies subject barack 1614, relation defeated 1622, and object sarah 1626. Declarations declaration 1658, declaration 1660, declaration 1662, and declaration 1664 correspond to statement 1628. The declaration 1658 specifies subject scope-entity 1630, relation election 1632. No object is specified. The declaration 1660 specifies subject scope-entity 1630, relation has-date 1634, and object 2008-11-04. The declaration 1662 specifies subject scope-entity 1630, relation has-winner 1636, and barack 1614. The declaration 1664 specifies subject scope-entity 1630, relation has-winner 1636, and joe 1612.

Declarations declaration 1666, declaration 1668, declaration 1670, declaration 1672, declaration 1674, declaration 1676, and declaration 1678 correspond to statement 1638. Declaration declaration 1666 specifies subject chicago 1680, relation has-mayor 1682, and object richard 1684. Declaration declaration 1668 specifies subject chicago 1680, relation has-county 1686, and object cook 1688. Declaration declaration 1670 specifies subject Springfield 1690 and relation is-capitol 1692. Declaration declaration 1672 specifies subject Springfield 1690, relation has-mayor 1682, and object timothy 1694. Declaration declaration 1674 specifies subject illinois 1642, relation has-city 1644, and object chicago 1680. Declaration declaration 1676 specifies subject illinois 1642, relation has-city 1644, and object Springfield 1690. Declaration declaration 1678 specifies subject barack 1614, relation has-home-state 1640, and object illinois 1642. Note that nested scopes are processed from inside to outside, so that all of the objects of a predicate have been processed before the predicate itself is applied.

I claim:

1. A method of processing text to declarations, comprising parsing said text, said parsing including detecting at least one statement representation, said statement representation a constituent of said text, and said statement representation having at least one subject entity representation and, optionally, at least one predicate representation, detecting said subject entity representation, said subject entity having any of a nominal entity representation and a scoped entity representation, detecting said nominal entity representation, detecting said scoped entity representation, said scoped entity representation having an optional nominal specification and at least one predicate representation;

detecting said nominal specification, detecting said predicate representation, said predicate representation having a relation representation, and, optionally, at least one object entity representation, said at least one object entity representation having any of a nominal entity representation and a scope entity representation, detecting said relation representation, and detecting said object entity representation;

creating an object-oriented data structure in correspondence to said text, said creating including creating a statement instance in response said detecting of said statement representation, said statement instance having a subject entity instance corresponding to each of said at least one subject entity representation, and said statement instance having a predicate instance corresponding to each of said optional at least one predicate representation, creating a nominal entity instance in response said detecting of said nominal entity representation, creating a scoped entity instance in response said detecting of said scoped entity representation, creating a predicate instance in response to said detecting of said predicate representation, said predicate instance having a relation instance corresponding to said relation representation, and said predicate instance having an object entity instance corresponding to each of said optional at least one object entity representation, creating a relation instance in response said detecting of said relation representation;

processing said object-oriented data structure to generate declarations. said processing including receiving a sequence of expression instances, said sequence of expression instances including any of said statement instance, said predicate instance, said scoped entity instance, and said nominal entity instance, processing said nominal entity instance to determine a corresponding dispatch entity instance, processing said predicate instance to determine a corresponding dispatch relation instance, and, for each of said object entity instances, determining a corresponding object dispatch entity instance, processing said predicate instance in conjunction with a subject entity instance, according to the presence said optional object entity instances of said predicate instance, in the event of said predicate instance having at least one of said optional object entity instances, for each of said optional object entity instances, providing a declaration, one of said declarations, said declaration having said subject dispatch entity instance corresponding to said subject entity instance, said dispatch relation instance corresponding to said predicate relation entity, and said object dispatch entity instance corresponding to said optional object entity instance, alternatively, in the event of said predicate instance lacking said optional object entity instances, providing a declaration, one of said declarations, said declaration having said subject dispatch entity instance corresponding to said subject entity instance, and said dispatch relation instance corresponding to said predicate relation entity, processing said scoped instance to determine a corresponding subject dispatch entity instance, making use of said corresponding nominal specification, if any, and, for each of said predicate instances of said scoped instance, processing said predicate instance in conjunction with said scoped instance, and processing said statement instance to determine a corresponding subject dispatch entity instance for each of said at least one subject entity instances, and, for each combination of said at least one subject entity instances with said predicate instances, processing said predicate instance in conjunction with said at least one subject entity instance.

\* \* \* \* \*